United States Patent [19]
Drewery

[11] Patent Number: 5,426,465
[45] Date of Patent: Jun. 20, 1995

[54] TELEVISION SYSTEMS

[75] Inventor: John O. Drewery, Sutton, United Kingdom

[73] Assignee: British Broadcasting Corporation, London, England

[21] Appl. No.: 50,373

[22] PCT Filed: Nov. 21, 1991

[86] PCT No.: PCT/GB91/02075

§ 371 Date: May 12, 1993

§ 102(e) Date: May 12, 1993

[87] PCT Pub. No.: WO92/10068

PCT Pub. Date: Jun. 11, 1992

[30] Foreign Application Priority Data

Nov. 22, 1990 [GB] United Kingdom ............. 9025400

[51] Int. Cl.$^6$ ............................................ H04N 11/06
[52] U.S. Cl. ................................. 348/427; 348/392
[58] Field of Search ............... 348/427, 428, 429, 392; H04N 11/00, 11/06, 11/16

[56] References Cited

U.S. PATENT DOCUMENTS

| | | | |
|---|---|---|---|
| 4,051,519 | 9/1977 | Weston | 348/392 |
| 4,212,028 | 7/1980 | Drewery | 348/392 |
| 4,322,739 | 3/1982 | Drewery et al. | 348/392 |
| 4,355,326 | 10/1982 | Lee . | |

FOREIGN PATENT DOCUMENTS 1534270 11/1978 United Kingdom .
2044577 10/1980 United Kingdom .
2113037 12/1983 United Kingdom .

OTHER PUBLICATIONS

J. O. Drewery, "A compatible improved PAL system", EBU Review-Technical, No. 215, Feb. 1986, pp. 3–18.
G. A. Thomas, "The Use of Clean-Pal to Feed Enhanced Distribution Systems" IEE, 1992, 214–218.

Primary Examiner—Victor R. Kostak
Assistant Examiner—Nathan J. Flynn
Attorney, Agent, or Firm—Kevin J. Fournier

[57] ABSTRACT

To increase the horizontal bandwith of the Weston PAL chrominance signal spectrum folding techniques are used. Spectral components with high horizontal frequency and low vertical and/or temporal frequency are carried as components with low horizontal frequency and high vertical and/or temporal frequency. A matrix (120) forms U+V(P) and U−V(M) chrominance signals which are then prefiltered using either rhombic spatial filters or rhombic vertical-temporal filters (122, 124). The two signals are then sampled by sampler (126, 128) which together with switch (136) form U+V samples on alternate lines to the U−V samples. The sampling patterns for the P and M signals are identical but shifted.

27 Claims, 29 Drawing Sheets

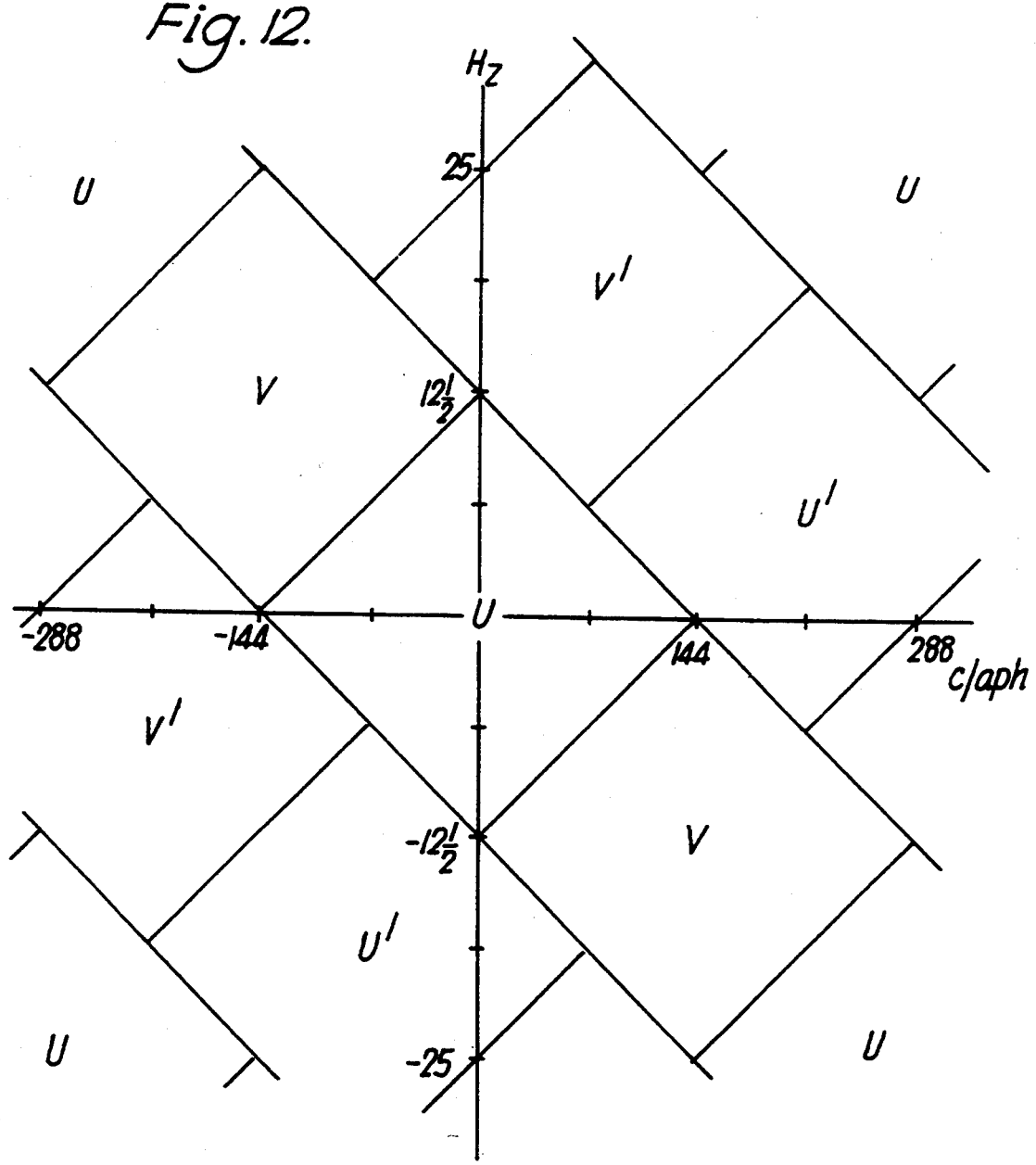

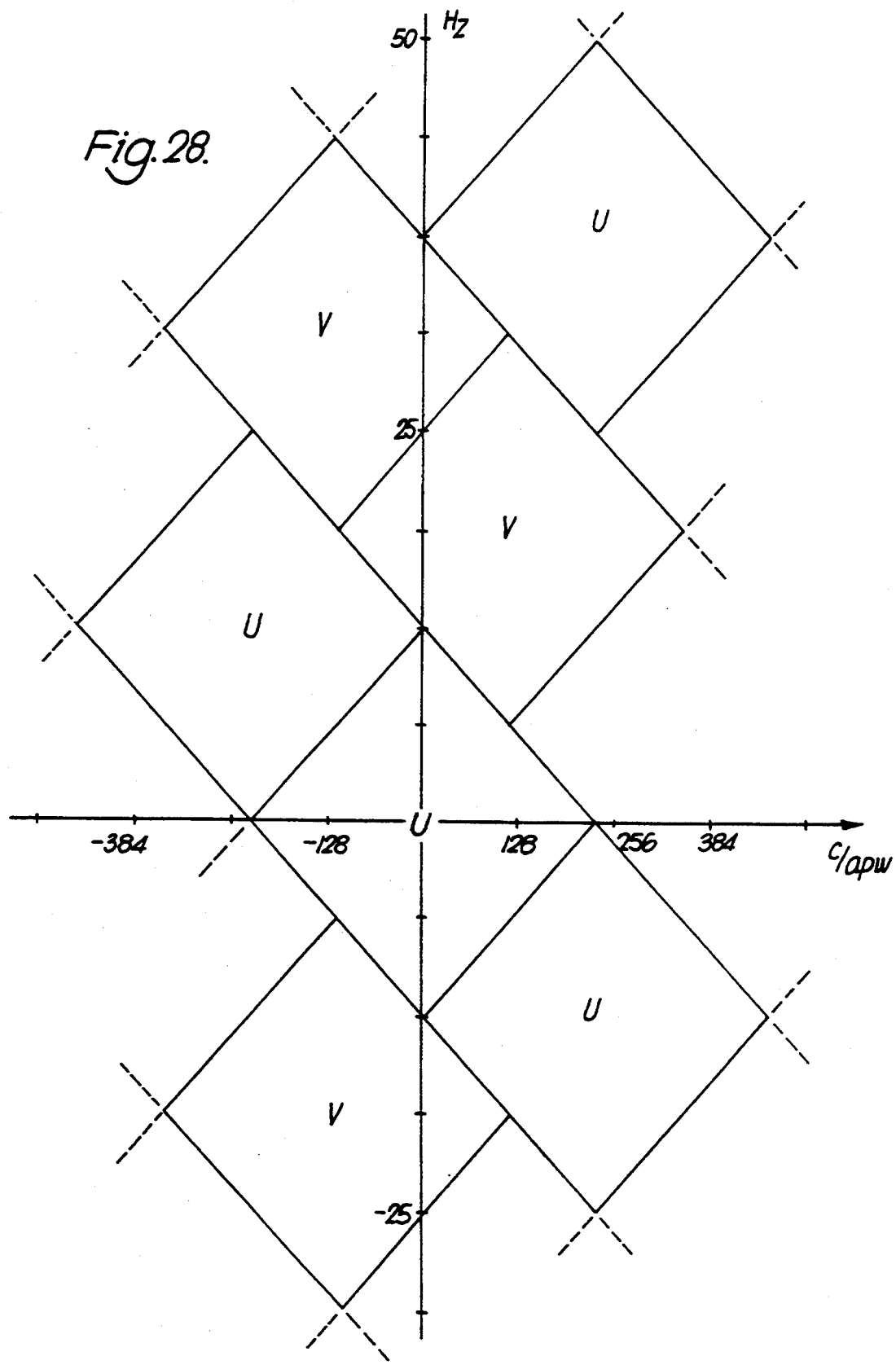

TELEVISION SYSTEMS

FIELD OF THE INVENTION

This invention relates to television and video systems, and in particular to methods and apparatus for increasing the horizontal bandwidth of the chrominance signal in a video signal.

BACKGROUND TO THE INVENTION

A system for transmitting luminance and chrominance without interaction through a PAL channel has been proposed, known as Weston Clean PAL and described in GB-A-2044577 and GB-A-2113037 the disclosures of which are incorporated herein by reference. This system obtains separation of luminance and chrominance by making them look as if they are effectively in phase quadrature over the chrominance region before manipulating them to look like a PAL signal. This separation process is discussed in more detail in "A Compatible Improved PAL System" published in the EBU review, February 1986. This is achieved by sampling the luminance at twice the subcarrier frequency, so making it appear as double-sideband modulation of the subcarrier in one phase and, at the same time, forming the U and V chrominance into a single signal which modulates the quadrature phase of the subcarrier. This phase separation is effective so long as both sidebands of both phases are equal. If they are not, then cross-talk between luminance and chrominance will occur at the frequencies where the inequality occurs. As the video signal is limited in bandwidth it therefore follows that the bandwidth of the chrominance signal is limited to the difference between the maximum video frequency and the subcarrier frequency. For system I PAL this is 1.1. MHz, for a system BG PAL this is approximately 0.57 MHz.

In the simplest case with system I PAL, where only vertical filtering is used before combining the U and V signals into a single signal, the vertical bandwidth of the U and V signals is 72 cycles/active picture height (c/aph). On the other hand, the video bandwidth limit of 1.1 MHz corresponds to a horizontal bandwidth of 57 cycles/active picture width (c/apw). Bearing in mind the aspect ratio of the picture, which may be 4:3 or 16:9, it is apparent that the horizontal bandwidth limiting imposes a disparity between horizontal and vertical resolution which becomes substantial for a 16:9 aspect ratio. The spectrum of the combined chrominance is shown in FIG. 1 and is scaled assuming an aspect ratio of 16:9.

With more complex prefiltering of the U and V signals before combination, the vertical bandwidth can be increased at the expense of temporal bandwidth as described in "A Compatible Improved PAL System", published in the EBU Review, February 1986. In such a situation the horizontal/vertical disparity would then be further increased.

We have appreciated that it is possible to overcome this disparity by spectrum folding the U and V signals since the Weston system makes no assumption about the horizontal sampling of the signals. Spectrum folding is a known technique and allows spectral components with high horizontal frequency and low vertical and/or temporal frequency to be carried as components with low horizontal frequency and high vertical and/or temporal frequency, provided the signals are appropriately pre-filtered. It therefore exchanges certain spectral regions for others. The technique was first applied to component signals by Golding and Garlow in 1971 and subsequently to PAL signals by Phillips and Weston in 1974. In these applications a modest amount of folding allowed a video bandwidth of 20-30% above the channel bandwidth to be sent. However, by sacrificing more resolution in the vertical and/or temporal dimensions it is possible to double or even quadruple the horizontal bandwidth by an appropriate folding.

The invention is defined by the claims to which reference should now be made.

The invention is based on the appreciation that spectrum folding can be applied in the particular context of the chrominance channel of a Weston Clean PAL system. This means that there are certain constraints on the nature of the folding frequencies that can be applied since such folding requires the U and V video signals to be sampled with an appropriate structure whose vertical and temporal parts must also be compatible with the basic Weston Clean system. Such an operation may be regarded as preceding or being part of the combination of the U and V signals.

Preferably, the samples are turned into a continuous analogue signal by low pass filtering with a so-called "Nyquist" filter which cuts at half the video sampling frequency, proportional to the horizontal component of the sampling structure. As this cut frequency must be in the region of 1.1 MHz for system I PAL it, in turn, governs the horizontal component of the sampling structure. The analogue signal is then transmitted via the modulation and demodulation of the subcarrier in the normal way. The original samples can then be recovered from the transmitted signal by resampling it with the same structure and the samples must be post filtered to remove alias components, yielding U and V signals with increased horizontal bandwidth. Again this process can be considered as following or being part of the separation of the U and V signals.

DESCRIPTION OF DRAWINGS

Embodiments of the invention will now be described, by way of example, and with reference to the accompanying drawings in which:

FIG. 12—shows the vertical-temporal cross-section at the horizontal frequency of 57 c/apw of the spectrum of combined chrominance using an alternative filter;

FIG. 28—shows horizontal-temporal cross-section at zero vertical frequency of spectrum of combined chrominance sampled with pattern of FIG. 27 and filtered with rhombic horizontal-temporal filter;

DESCRIPTION OF BEST MODE FOR CARRYING OUT THE INVENTION

Instead of regarding the formation of the single chrominance signal in a Weston Clean PAL system as the combination of U and switched V signals the resultant spectrum may be regarded as the sum of $U+V$ and $U-V$ signals which have been vertically subsampled by a factor of 2 in opposite phases. The subsampling halves the vertical repeat of the spectra but, assuming the origin coincides with a $U+V$ signal the anti-phase sampling of the $U-V$ signals inverts odd order spectra, as shown in FIG. 2. When the $U+V$ and $U-V$ spectra are combined, therefore, the V part cancels on even orders and the U part cancels on odd orders to give the spectrum shown in FIG. 1. The signals $U+V$ and $U-V$ will hereinafter be referred to as P and M respectively. Thus the combination of the P and M signals in the space-time domain yields U and V signals in the frequency domain.

Figure 3:
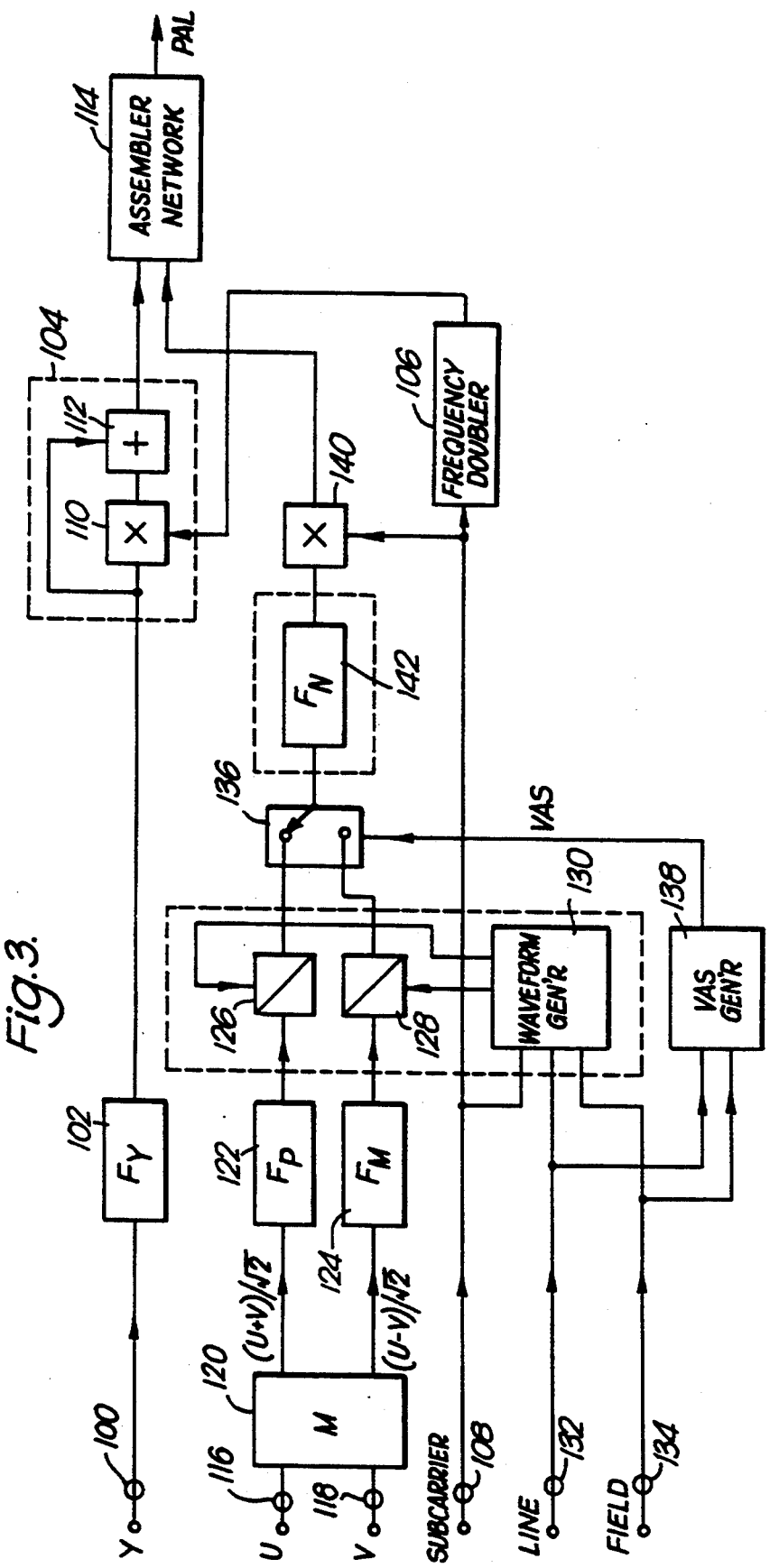
FIG. 3—is a schematic block diagram of a coder embodying the invention.

FIG. 3 shows a general block diagram of a coder embodying the invention. Most of this is needed for the normal Weston Clean coder, as previously disclosed in a GB-A-2044577 and GB-A-2113037 and only those parts enclosed by the dotted outline are new. The Y luminance signal, appearing on a line 100, is pre-filtered by filter $F_Y$ 102 and then effectively sampled at twice the subcarrier frequency by arrangement 104, which takes a feed of twice the subcarrier frequency, obtained from frequency doubler 106 acting on the subcarrier appearing on a line 108. The arrangement 104 comprises a multiplier 110 which multiplies the signal by the twice-subcarrier waveform and an adder 112 which adds the resultant to the original, thereby simulating the action of sampling over the band of interest. The "sampled" signal is then fed to one port of an assembler network 114 as previously disclosed in GS-A-2044577 and GB-A-2113037. The U and V chrominance signals, appearing on lines 116 and 118 are first matrixed to $U+V$ and $U-V$, i.e. P and M signals, in a matrix 120 and then filtered by filters $F_P$ and $F_M$ 122, 124 which may be identical. The filtered signals are then sampled along horizontal video lines in samplers 126 and 128 which receive sampling waveforms from waveform generator 130. The samplers 126 and 128 may be realised in the same way as arrangement 104 but are shown as samplers for the purposes of the following explanation. Waveform generator 130 derives the sampling waveforms from the subcarrier, line and field pulses appearing over lines 108, 132 and 134. The "sampled" P and M signals are then fed to the inputs of a switch 136 which operates so as to select one or other on alternate lines in response to a V axis switch (VAS) signal, derived in VAS generator 138. In an alternative embodiment (not shown) the VAS and waveform generators are combined. The switch 136 and the sampler 126, 128 can also be combined with the sampler outputs connected together so as to yield an equivalent pair of sampling waveforms each operating on alternate lines. The single chrominance signal then modulates the subcarrier in the appropriate phase in multiplier 140, having been first low-pass filtered by filter $F_N$ 142, and combined with the luminance in the assembler network 114 in the normal way. The characteristic of filter $F_N$ 128 depends on the nature of the assembler network. If the assembler contains a filter which defines the passband of the modulated chrominance, as previously disclosed, then $F_N$ may cut anywhere in the range of 1.1 to 3.3 MHz. On the other hand, if the assembler has no effect on the modulated chrominance then $F_N$ is a so-called Nyquist filter, cutting at 1.1 MHz. The Nyquist filter may be a square root filter.

Figure 4:
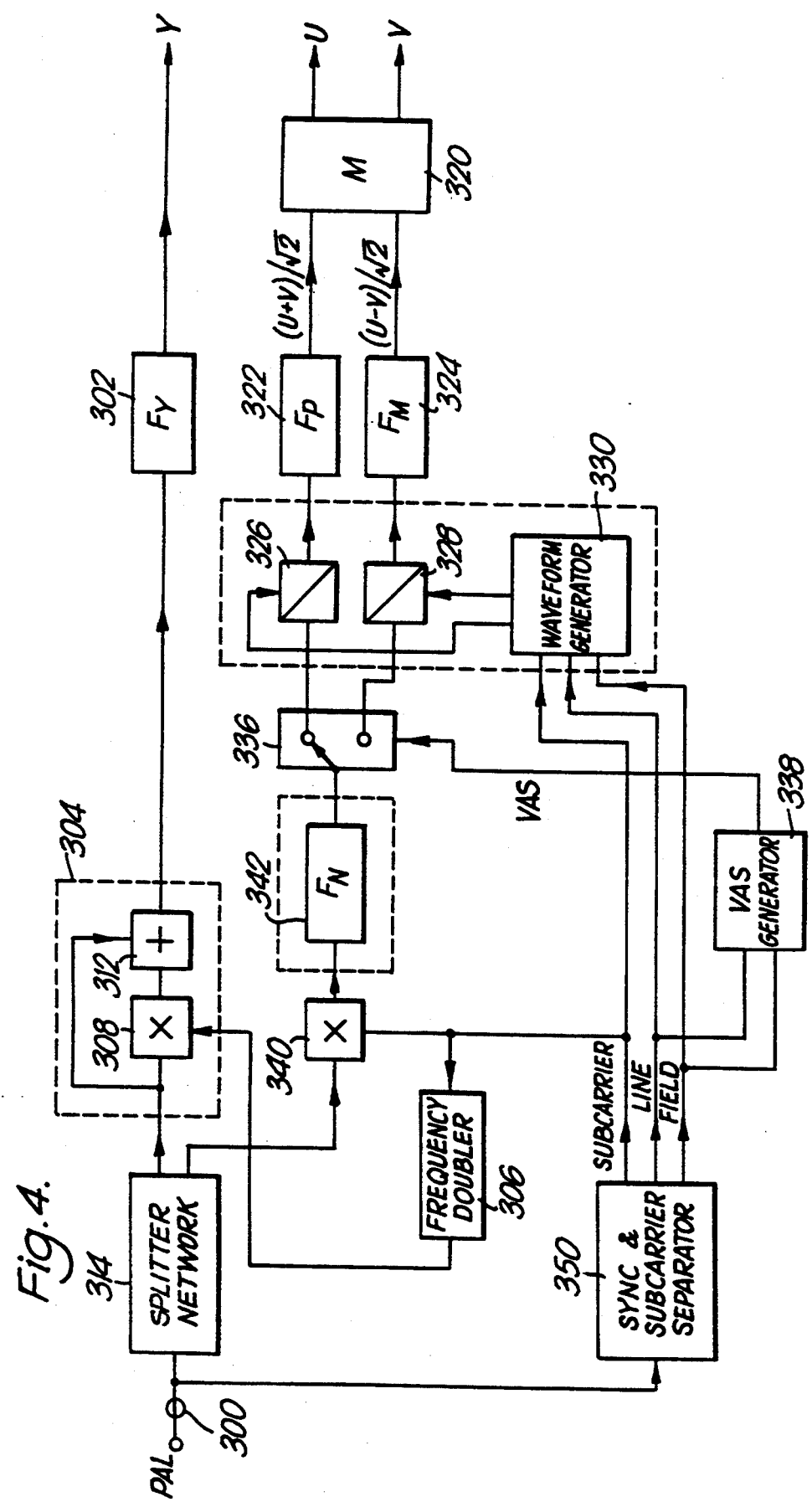
FIG. 4—is a schematic block diagram of a decoder embodying the invention.

The decoder shown in FIG. 4 is based on the conventional Weston PAL decoder, as previously disclosed, and again the new parts are enclosed by the dotted outline. In FIG. 4, features having a counterpart in the coder are referred to by the same reference numeral incremented by 200.

A PAL input signal appearing on a line 300, is split into two signals by a splitter network 314 as previously disclosed, and one output is effectively sampled at twice the subcarrier frequency in the appropriate phase by arrangement 304 which takes a feed of twice the subcarrier from a frequency doubler 306 acting on the subcarrier obtained from a separator circuit 350 fed with the PAL signal. Arrangement 304 acts as in the coder and the resultant Y signal is then post-filtered by filter $F_Y$ 302 to remove the alias spectra generated by the effective sampling. Meanwhile, the other output of splitter 314 is demodulated to line-alternating P and M signals by multiplying it in circuit 340 by the subcarrier in the appropriate phase derived from separator 350. The demodulated signal is then low-pass filtered by filter $F_N$ 342 whose characteristic depends on the nature of the splitter network. If the splitter contains a filter which defines the passband of the modulated chrominance as previously disclosed, then $F_N$ may cut anywhere in the range 1.1 to 7.7 MHz. On the other hand, if the splitter has no effect on the modulated chrominance, then $F_N$ is a Nyquist filter, cutting at 1.1 MHz. The filtered signal is then fed to a switch 336 which operates so as to distribute it on alternate lines to one or other of a pair of samplers 326 and 328 in response to a VAS signal, derived in generator 338. The samplers 326 and 328 receive waveforms which are identical to those used at the coder from a waveform generator 330, fed with the subcarrier, line and field signals derived from separator 350. Alternatively, generators 330 and 338 may be combined and switch 336 combined with the samplers with their outputs connected together so as to yield an equivalent pair of waveforms, each operating only on alternate lines with the signal from $F_N$ feeding both samplers. The samplers 326 and 328 may be realised in the same way as arrangement 304. The "sampled" P and M signals are then post-filtered by filters $F_P$ 322 and $F_M$ 324, which may or may not be identical to those used at the coder, to remove alias components generated by the sampling processes. Finally the filtered P and M signals are matrixed in circuit 320 to U and V signals.

Several variations of the technique will now be described having differing sampling waveforms and differing filters $F_P$ and $F_M$. These variations will result in differing three-dimensional spectra for the U and V signals but they must all have the property of being compatible with the original system as previously disclosed without the extra sampling. In order that this may happen the sampling pattern for the P component must always lie on alternate field lines with a progressively upward field-to-field shift of one picture line.

Moreover, the sampling pattern for the M component must always be a shifted version of that for the P component. As mentioned above the horizontal component of the sampling pattern is dictated by the bandwidth of the Nyquist filters which results in a value of 114 c/apw. This is very close to the spatial frequency corresponding to the video frequency $f_{SC}/2$ which could easily be regenerated from the burst. However, such a frequency would need to be phase perturbed as it would otherwise not have the correct line-to-line phase relationship. This means that the basic structures are all derivable by dividing a clock frequency of $4f_{SC}$ which is approximately line repetitive. The sampling frequency is suitable for system I PAL. A different system such as system BG PAL would require a frequency of $f_{SC}/4$. In general, the sampling frequency should be an integral submultiple of the colour subcarrier equal to substantially twice the difference between the transmission channel bandwidth and the subcarrier.

FIRST VARIATION

Figure 5:
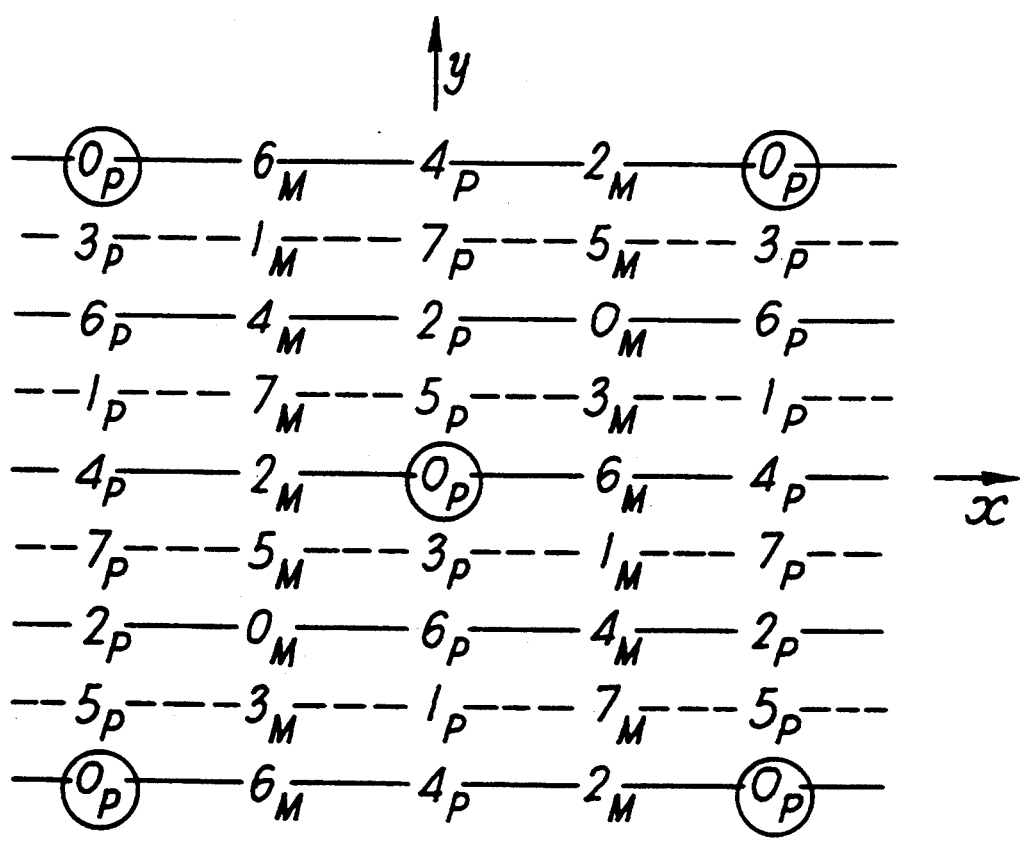
FIG. 5—shows the sampling pattern of a first embodiment.

The first variation of the technique uses the sampling pattern of FIG. 5 which is a spatial projection of a pattern that repeats after eight fields. The numbers are therefore field numbers modulo 8 and the subscripts indicate the P or M component. As can be seen the vertical repeat unit of the pattern is eight picture lines or 1/72 aph and the horizontal repeat unit is 1/114 apw. The pattern for a single component is quincunxial within the field with a horizontal field-to-field shift of half the horizontal repeat unit. To highlight this the samples of the P component in field zero are encircled in FIG. 5. The vertical part of the shift of M from P must be one quarter of the vertical repeat unit vertically (two lines in FIG. 5) but the horizontal part of the shift can be arbitrary as it affects only the phase of the folded over spectra. In FIG. 5 it is chosen to be one quarter of the horizontal repeat unit, giving real spectra but it could be reversed in sign, interchanging the 0,1,2,3 M sites with the 4,5,6,7 sites. The smallest horizontal increment corresponds to a sampling frequency of $2f_{SC}$.

Figure 6:
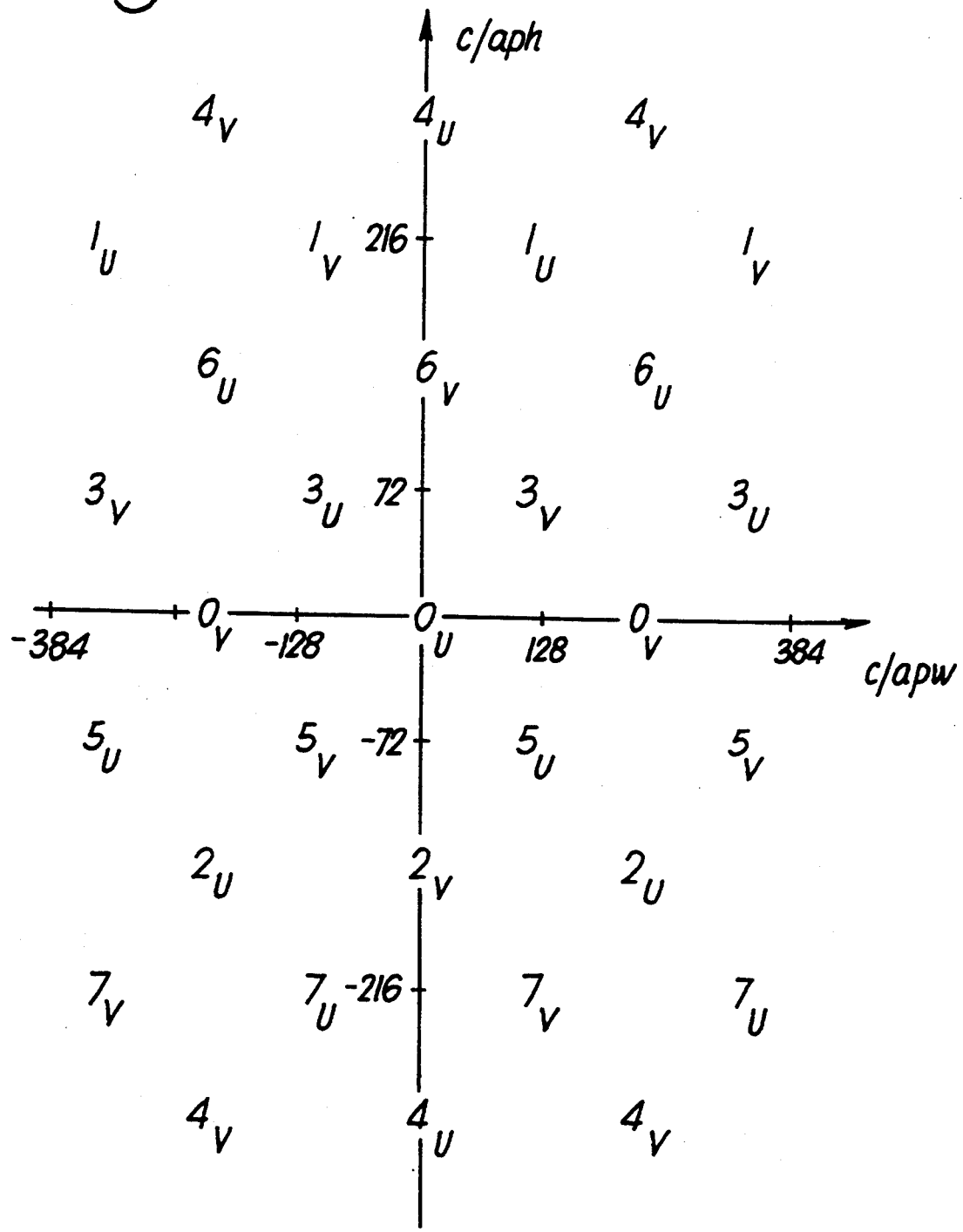
FIG. 6—shows the spatial protection of the fourier transform of sampling pattern shown in FIG. 5.
Figure 7:
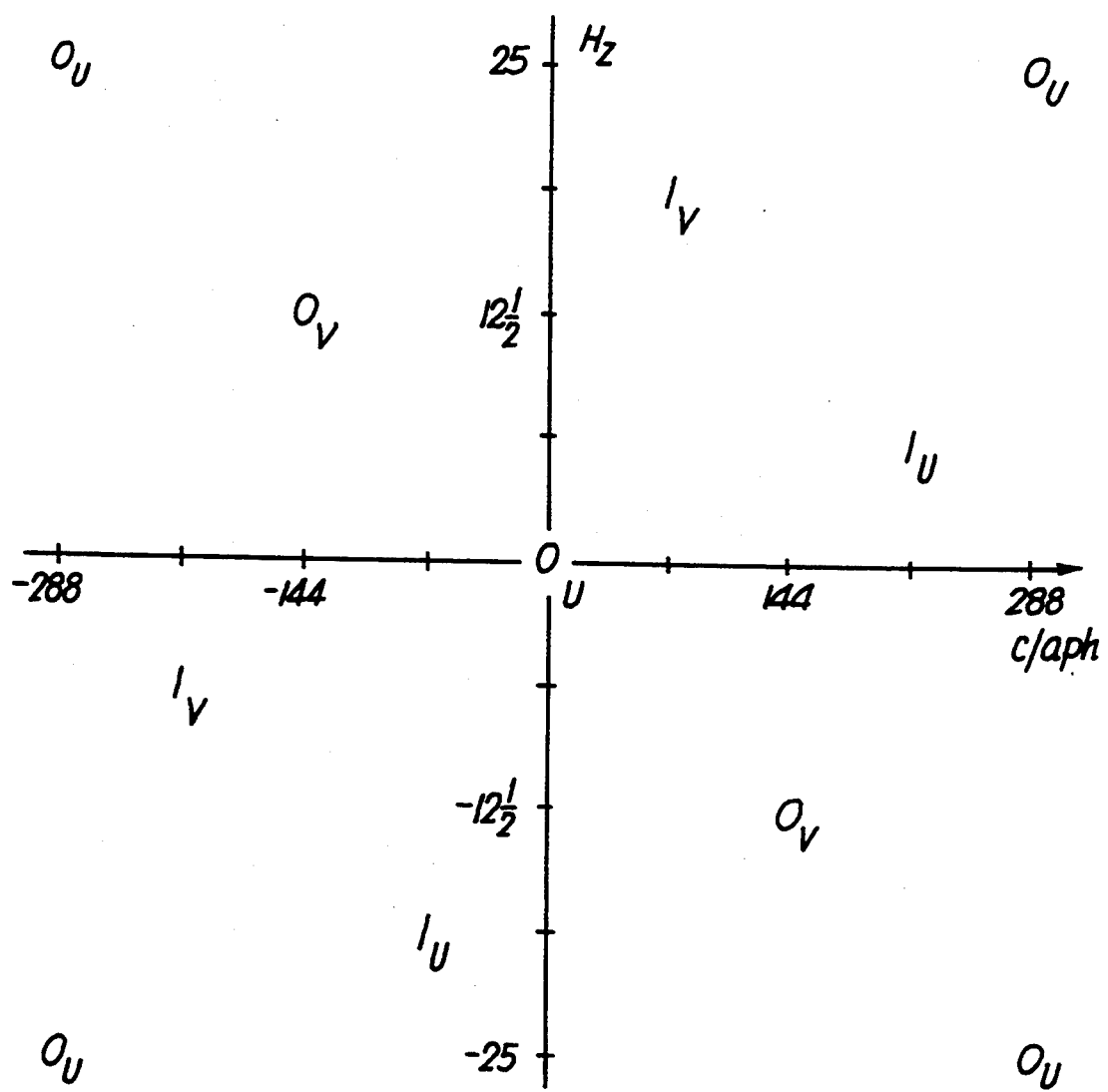
FIG. 7—shows the vertical temporal projection of the Fourier transform of the sampling pattern of FIG. 5.

The corresponding Fourier transform of this sampling pattern is shown in FIG. 6 as a spatial frequency projection where the numbers are temporal frequency in units of one eighth of the field frequency, modulo 8 and the subscripts indicate the U or V component. The vertical-temporal projection of this transform for the range 0–114 c/apw is shown in FIG. 7. Had the alternative PM shift been chosen the diagonal rows of U and V in FIG. 6 would have had the opposite slope and the positions of the folded U and V in FIG. 7 would have been interchanged.

Figure 8:
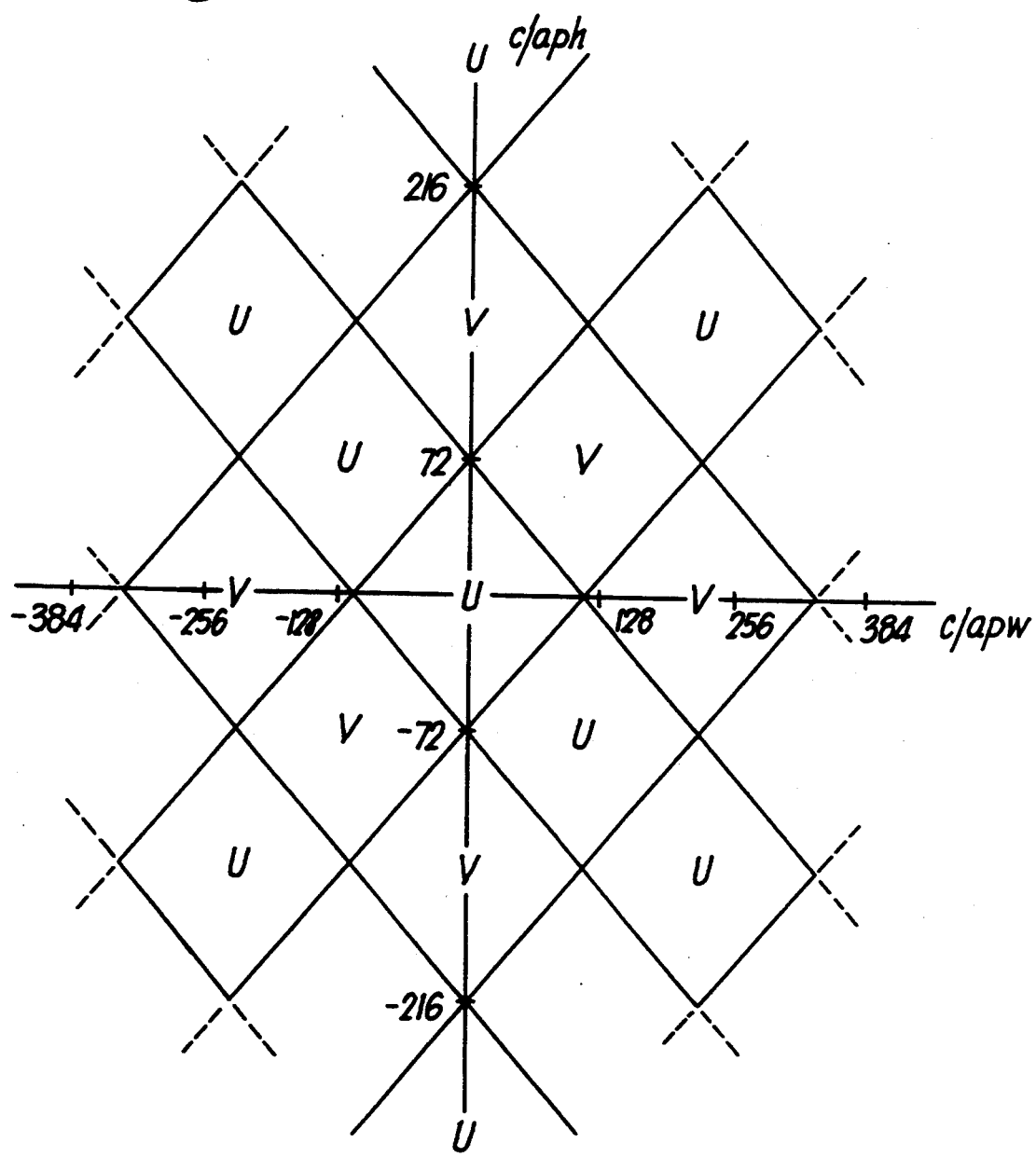
FIG. 8—shows the spatial projection of the spectrum of combined chrominance with rhombic filtering.
Figure 9:
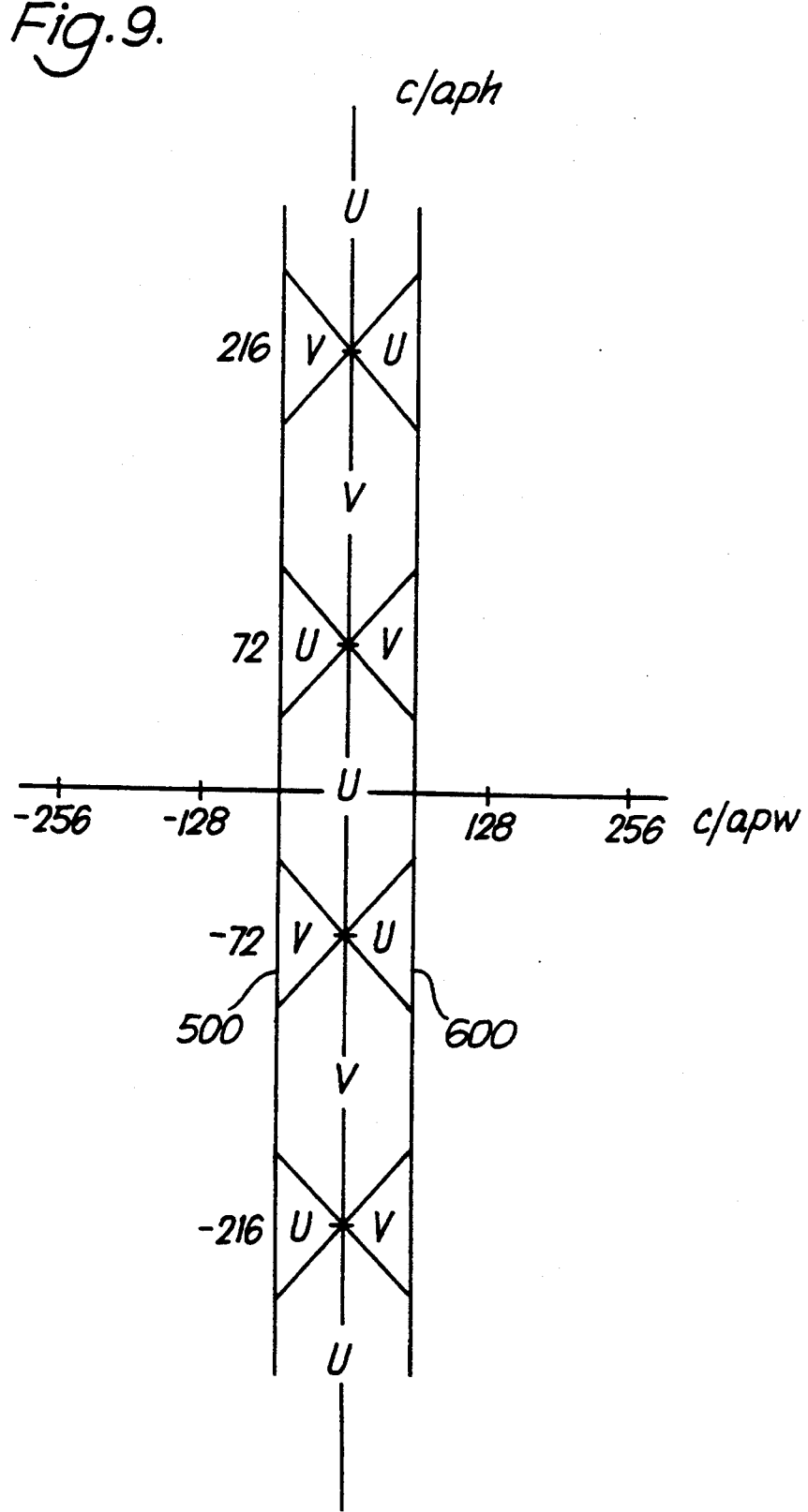
FIG. 9—shows the spectrum of FIG. 8 after Nyquist filtering.

FIG. 8 shows the spatial projection of the spectrum of the combined chrominance when using one possible filter for $F_P$ and $F_M$. This filter is purely spatial with a rhombic shape, having maximum dimensions of 114 c/apw and 72 c/aph. FIG. 9 shows the signal with the spectrum of FIG. 8 after low-pass filtering with a "Nyquist" filter cutting horizontally at 57 c/apw. It can be seen how the horizontal frequencies beyond 57 c/apw travel in the "fold over" regions, for example, regions 500 and 600. Again, with the alternative PM shift, the positions of the folded U and V would have been interchanged.

Figure 10:
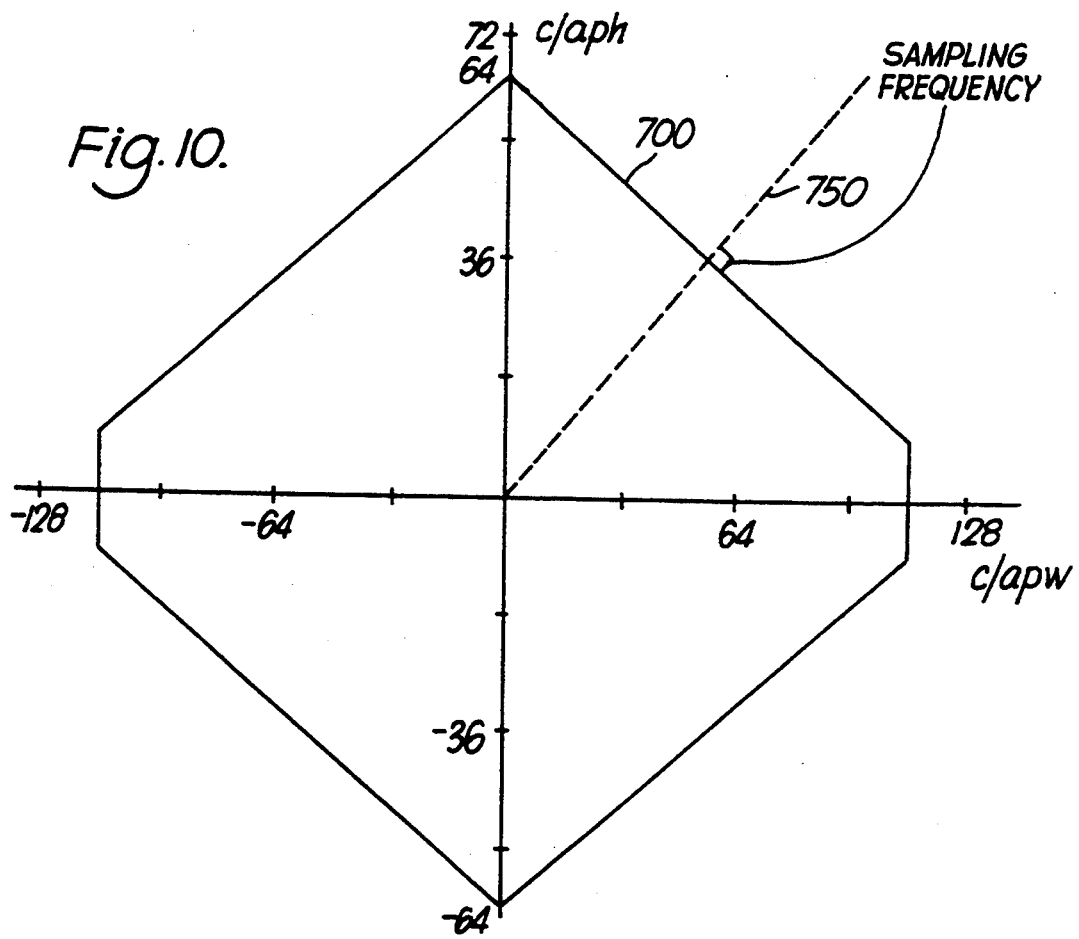
FIG. 10—shows the optimum spectral situation for a picture aspect ratio of 16:9.
Figure 11:
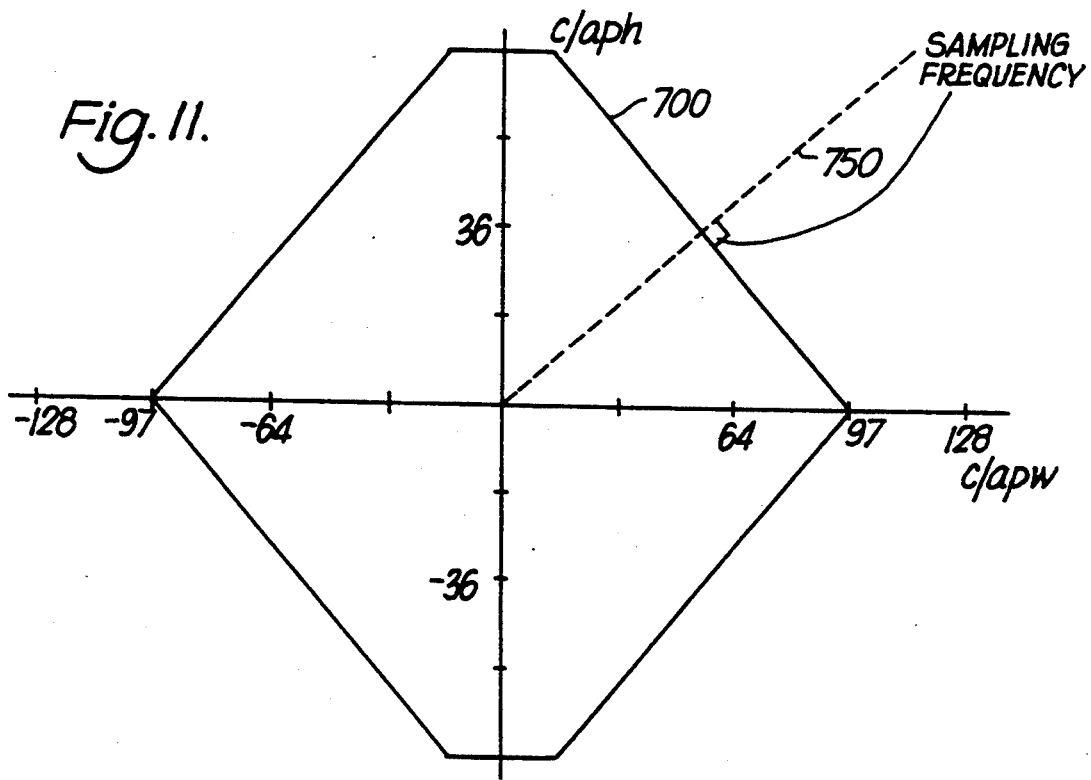
FIG. 11—shows the optimum spectral situation for a picture aspect ratio of 4:3.

FIGS. 10 and 11 show refinements of the purely spatial rhombic filter for use with 16:9 and 4:3 situations respectively. These have the property that their diagonal bound 700 is perpendicular to and bisected by the vector 750 joining the origin to the spatial projection of the sampling frequency which is different in the two cases because of the differing ratio of the picture width to height. The point of intersection of the vector 750 and the diagonal bound 700 is the sampling frequency. These shapes still allow the spectra to tessellate with the lattice of FIG. 8. In the 16:9 case the vertical resolution is reduced to 64 c/aph whereas in the 4:3 case the horizontal resolution is reduced to 97 c/apw.

Figure 1:
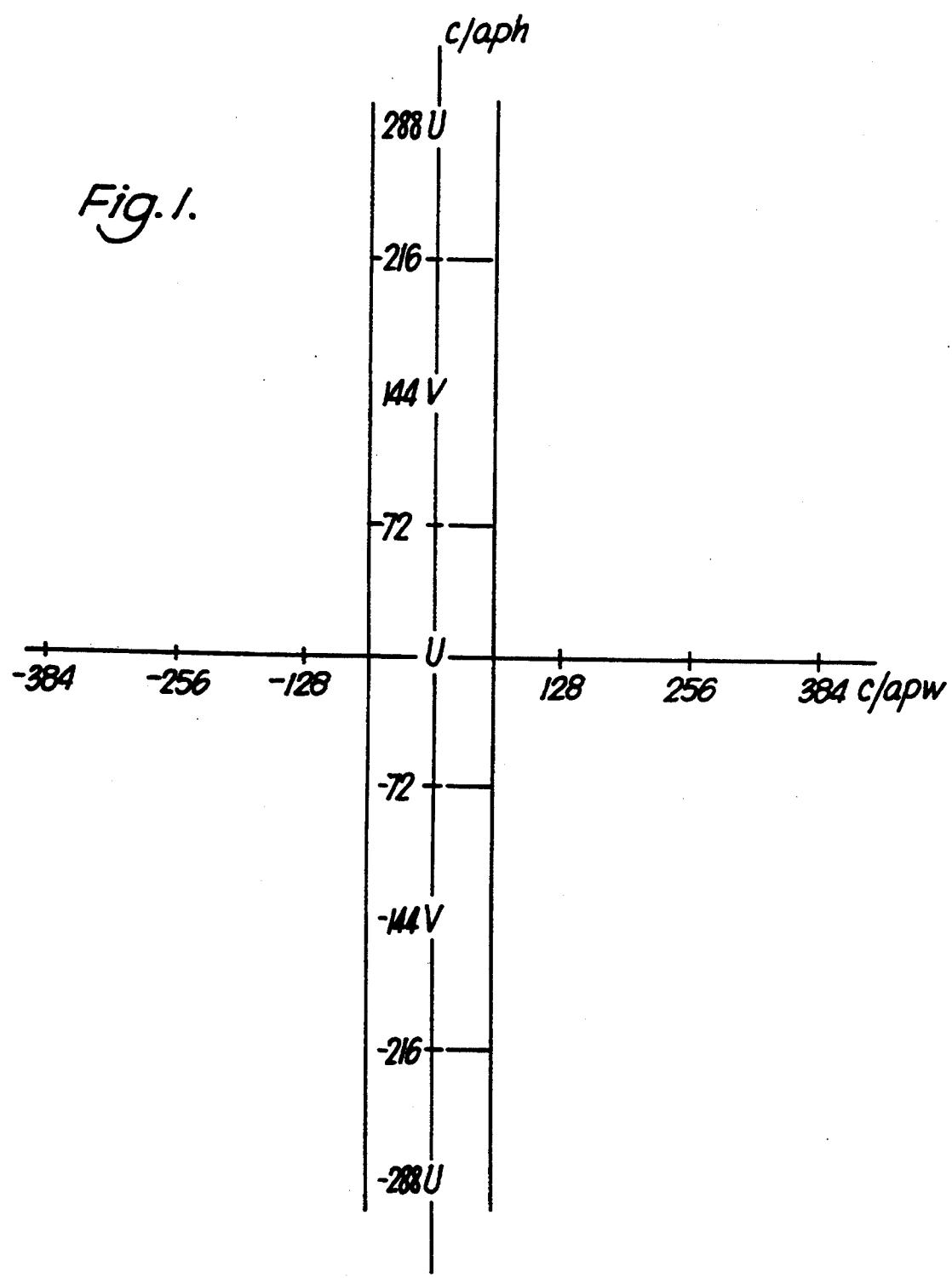
FIG. 1—shows the spectrum of a simple vertically filtered combined chrominance signal described previously.
Figure 2A:
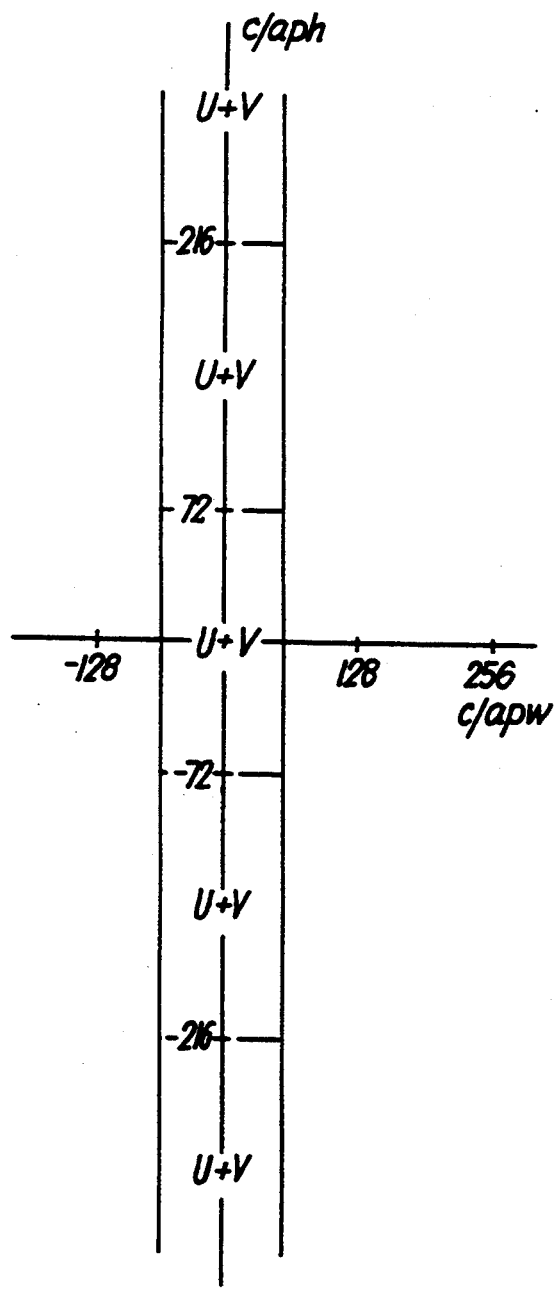
FIG. 2(a)—shows an alternative spectral view of combined chrominance signal U+V component.
Figure 2B:
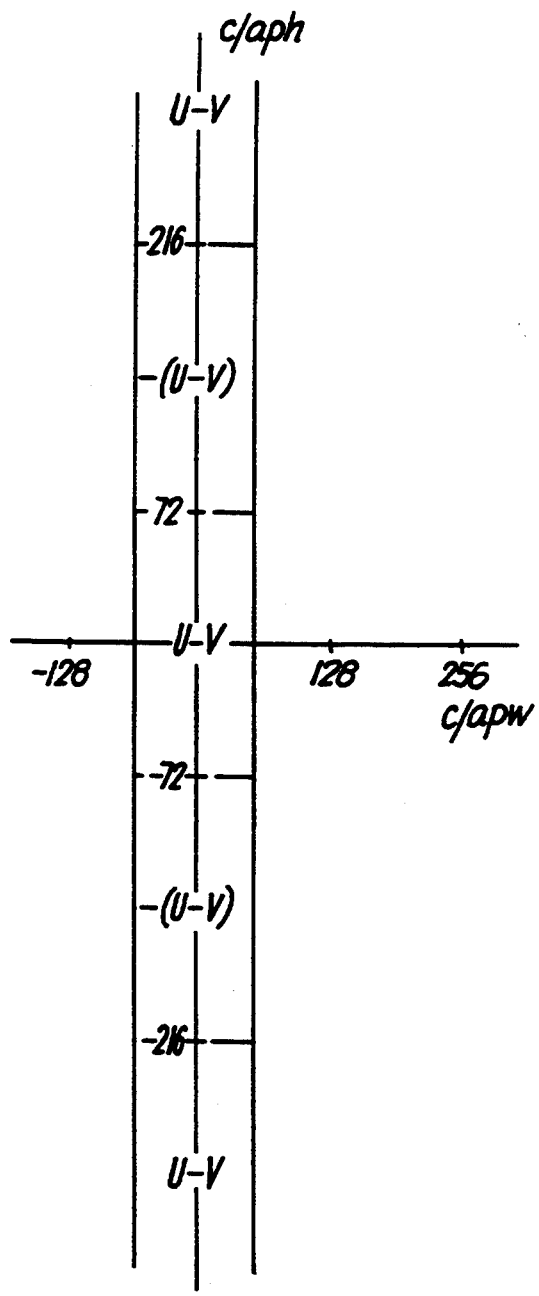
FIG. 2(b) shows an alternative spectral view of combined chrominance signal U−V component.

Comparing FIGS. 1 and 8 it can be seen that where there are no horizontal chrominance frequencies beyond 57 c/apw or diagonal frequencies in the corners of the one-dimensional rectangular boundaries the signals from a one-dimensional coder and a two-dimensional coder will be identical. Thus the result will be independent of the coder and decoder form. Where there are diagonal frequencies with a simple coder then, depending on the polarity of the slope, a complex decoder will interpret them as self-aliasing or cross-talk between the chrominance components, of high horizontal frequency with a low vertical component.

Where there are high horizontal frequencies with a complex coder a simple decoder will interpret them as diagonal frequencies with a vertical component 72 c/aph.

FIG. 12 shows the vertical-temporal projection of the spectrum of combined chrominance when using another possible filter for $F_P$ and $F_M$. This has a vertical-temporal rhombic shape with no horizontal variation. The vertical resolution of stationary spectral components has been increased to 144 c/aph in exchange for a maximum temporal resolution of $12\frac{1}{2}$ Hz. The horizontal resolution of stationary spectral components is now 114 c/apw for all vertical frequencies and components beyond 57 c/apw travel in the folded over spectra as before. The filter shape is the same as that proposed in the above mentioned reference for more complex filtering but which would have wasted spectral space. The wasted space is now occupied by the fold-over spectra which double the horizontal resolution. The rectangular stationary resolution characteristic with limits of 114 c/apw×144 c/aph is now double the original one-dimensional situation and thus has the same disparity in horizontal-vertical resolution.

SECOND VARIATION

Figure 13:
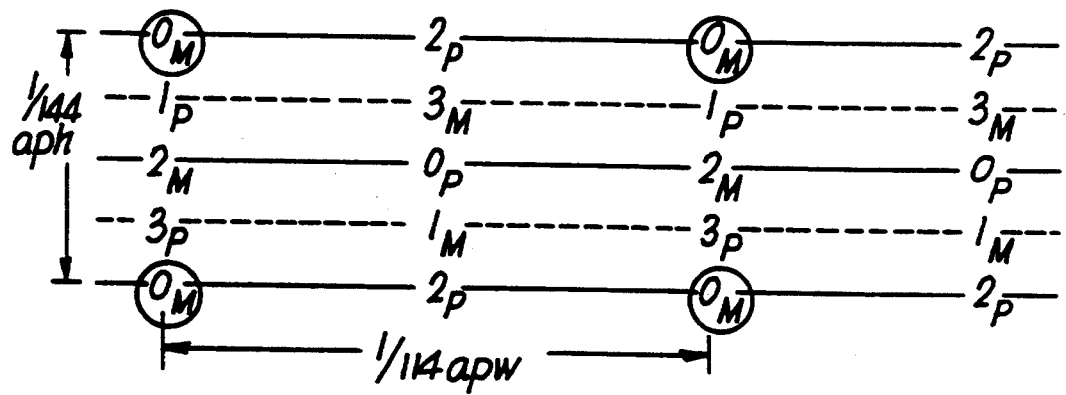
FIG. 13—shows the sampling pattern of a second embodiment with maximum horizontal PM shift.

The second variation of the technique uses the sampling pattern of FIG. 13 which is a spatial projection of a pattern that repeats over four fields. The numbers are therefore field numbers, modulo 4 and the subscripts indicate the P or M component. The vertical repeat unit is four picture lines or 1/144 aph and the horizontal repeat unit is 1/114 apw. The pattern for a single component is orthogonal within the field with a horizontal field-to-field shift of half the horizontal repeat unit. The samples of component M in the zeroth field are ringed for illustration. To give real fold-over spectra the horizontal part of the shift of M from P may now be zero or half the horizontal repeat unit. In FIG. 13 it is chosen to be a half, giving distinct P and M sites. The smallest horizontal increment corresponds to a sampling frequency of $f_{SC}$.

Figure 14:
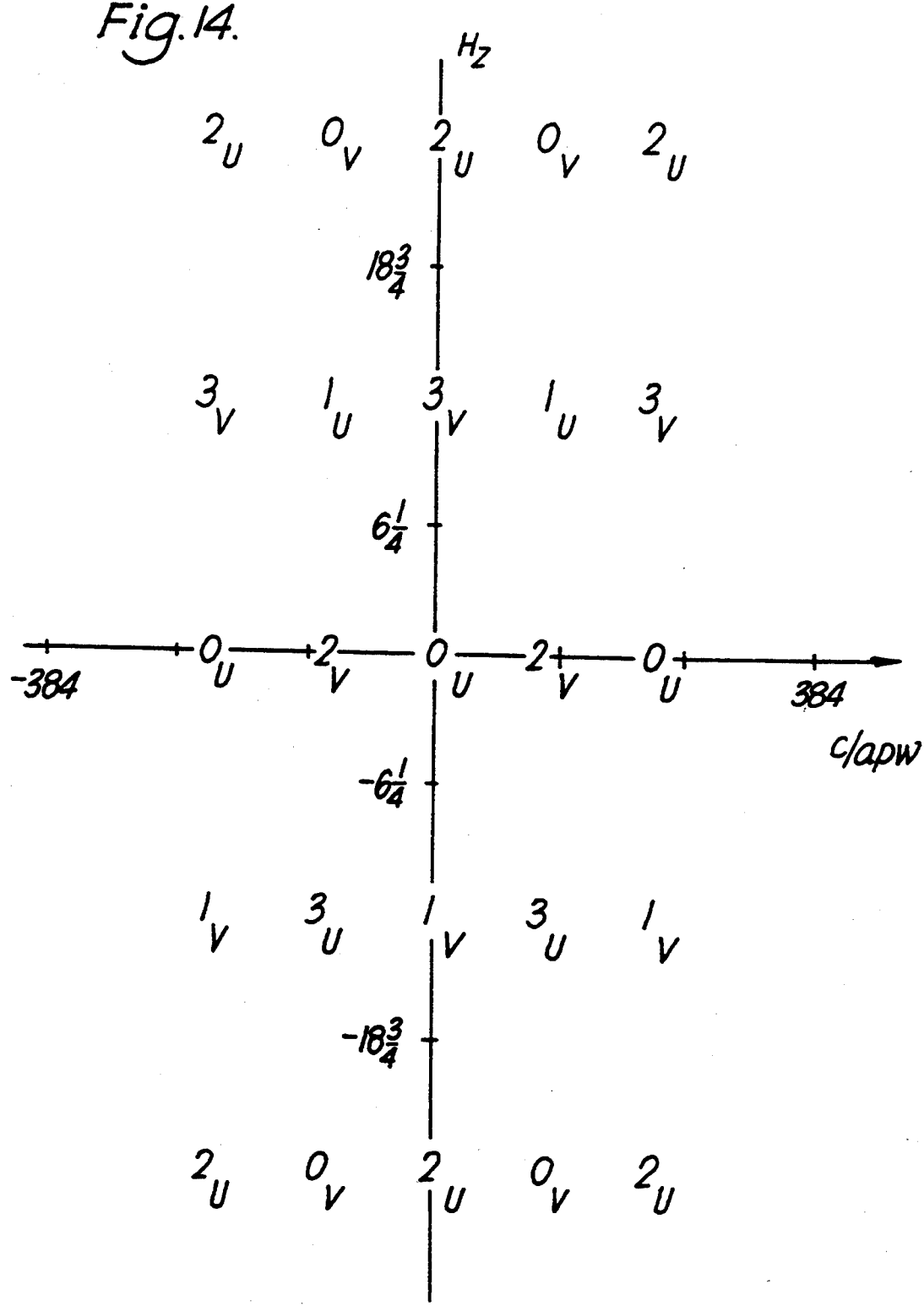
FIG. 14—shows the horizontal-temporal frequency projection of the Fourier transform of the sampling pattern of FIG. 13.
Figure 15:
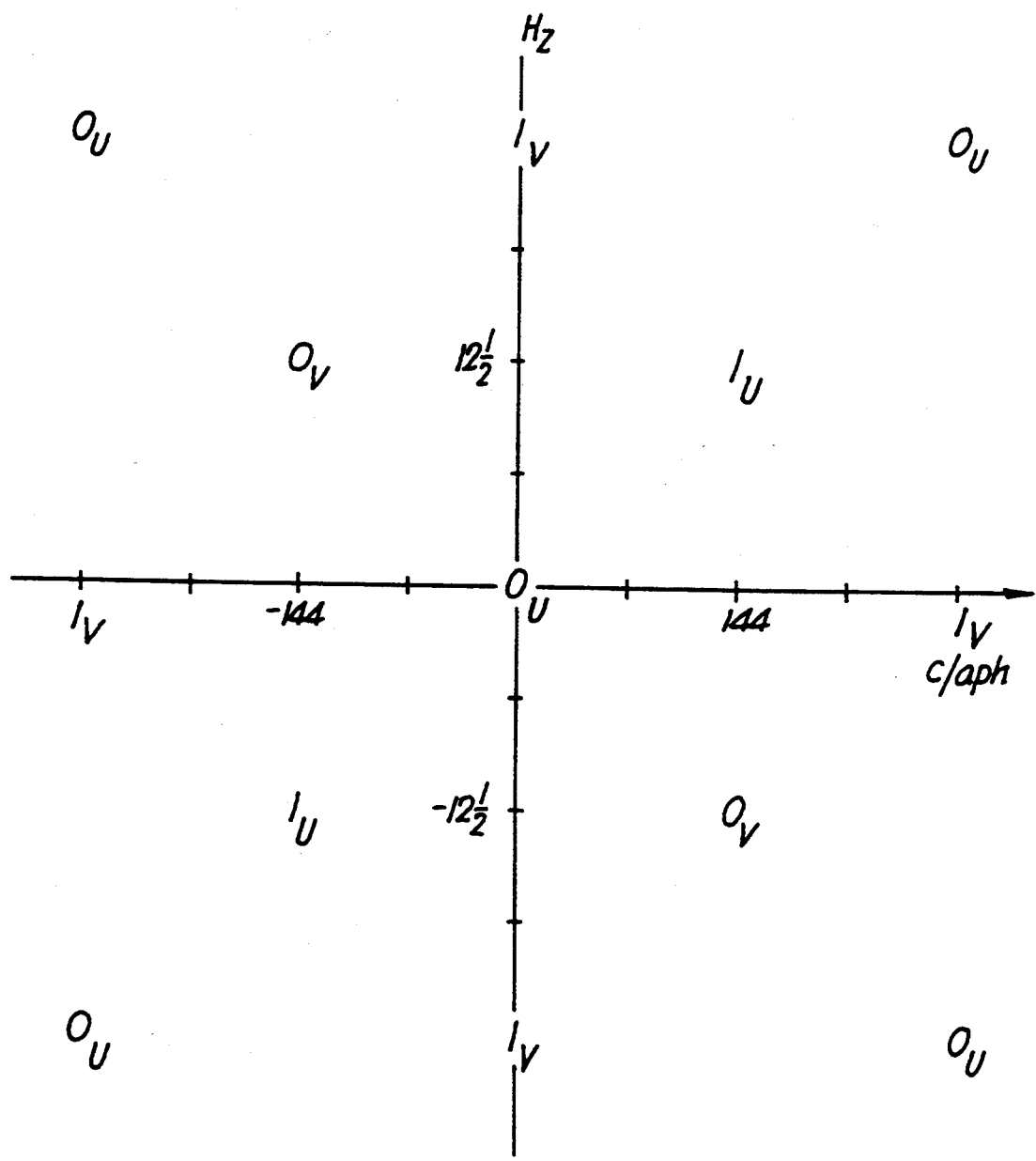
FIG. 15—shows the vertical temporal frequency projection of the Fourier transform of the sampling pattern of FIG. 13.

The Fourier transform of FIG. 13 is shown in FIG. 14 as a horizontal-temporal frequency projection where the numbers are vertical frequency in units of one quarter of the vertical sampling frequency, modulo 4 and the subscripts indicate the U or V component. FIG. 15 shows the vertical-temporal frequency projection where the numbers are horizontal frequency is units of horizontal sampling frequency. Comparing FIGS. 15 and 7, it can be seen that the diagonal rows of folded spectra in FIG. 15 are shifted so as to lie midway between those in FIG. 7.

Figure 16:
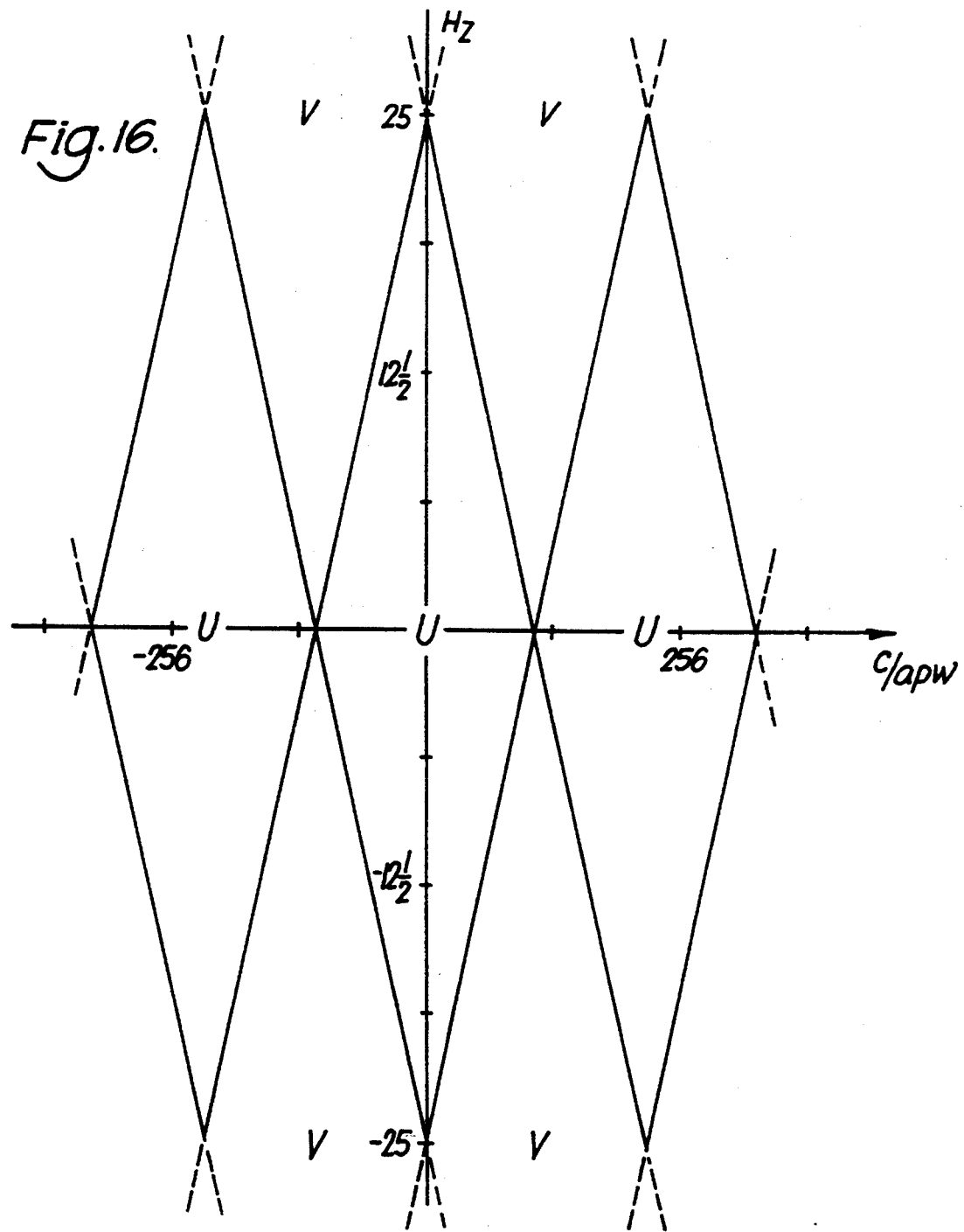
FIG. 16—shows the horizontal-temporal cross-section at zero vertical frequency of spectrum of combined chrominance sampled with pattern of FIG. 13 and filtered with rhombic horizontal-temporal filter.
Figure 17:
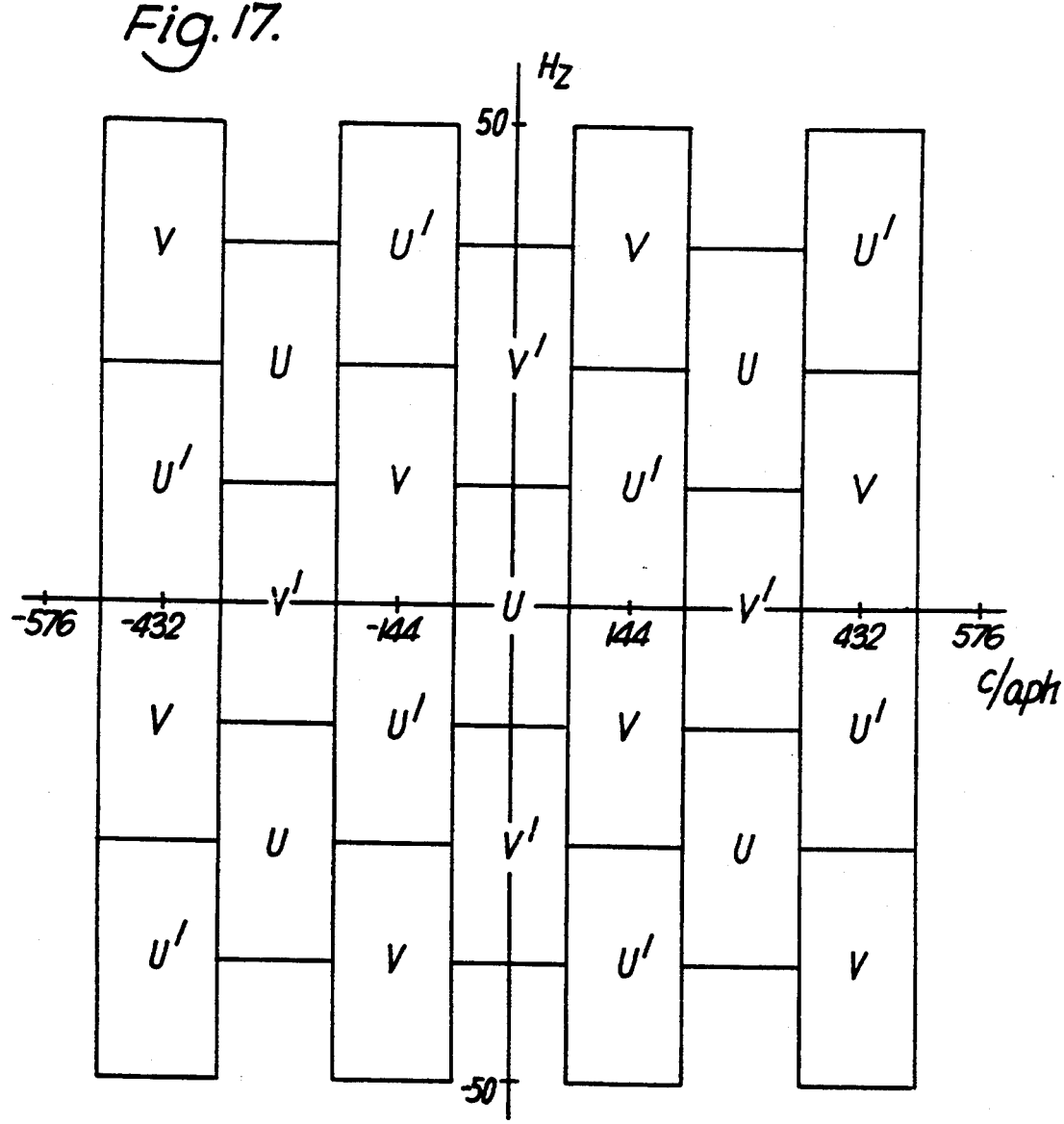
FIG. 17—shows the vertical-temporal cross-section at the horizontal frequency of 57 c/apw of the spectrum of FIG. 16.

FIG. 16 shows the horizontal-temporal projection of the spectrum of the combined chrominance when using a rhombic horizontal-temporal filter for $F_P$ and $F_M$ which trades off temporal for horizontal resolution. The maximum horizontal frequency is 114 c/apw in exchange for a maximum temporal frequency of 25 Hz. This characteristic has a vertical frequency bound of 72 c/aph so as to prevent overlap with other spectral layers at multiples of 144 c/aph. This can be seen in FIG. 17 which shows the vertical-temporal cross-section of FIG. 16 at the horizontal frequency of 57 c/apw. The folded V lies in the same vertical frequency range as the baseband U and vice versa for the folded U.

Figure 19:
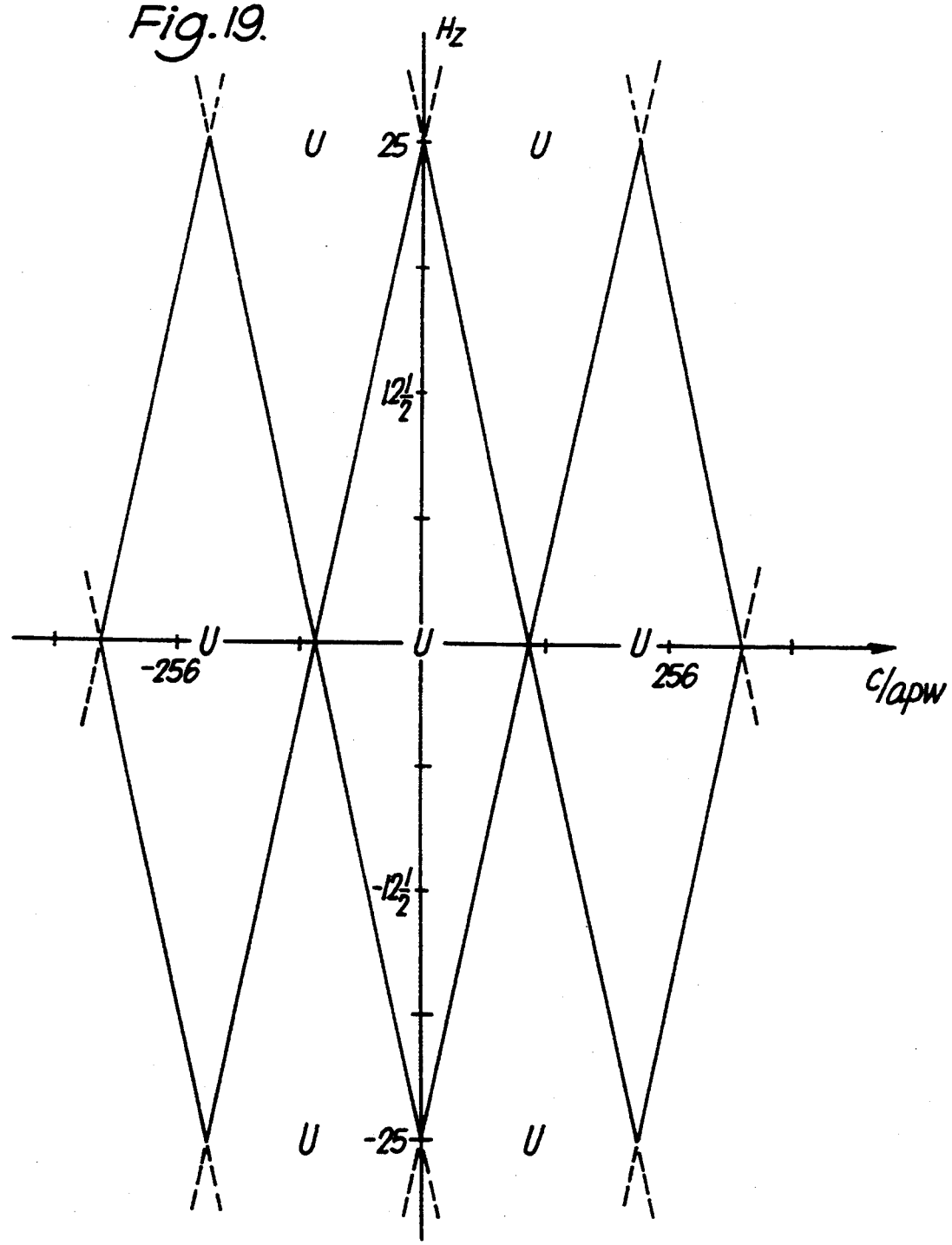
FIG. 19—shows the horizontal-temporal cross-section at zero vertical frequency of spectrum of combined chrominance sampled with pattern of FIG. 18 and filtered with rhombic horizontal-temporal filter.
Figure 20:
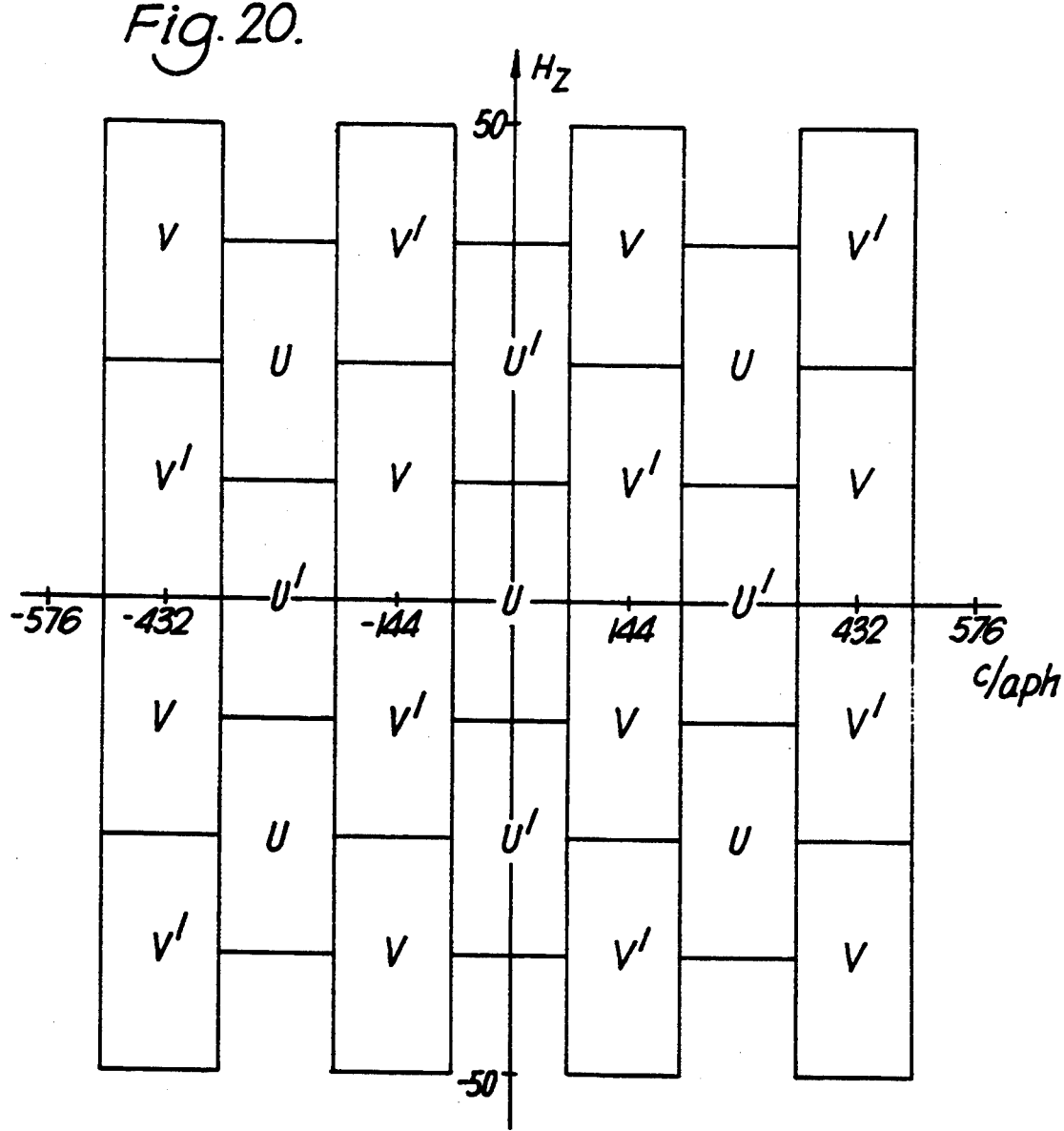
FIG. 20—shows the vertical-temporal cross-section at the horizontal frequency of 57 c/apw of the spectrum of FIG. 19.
Figure 18:
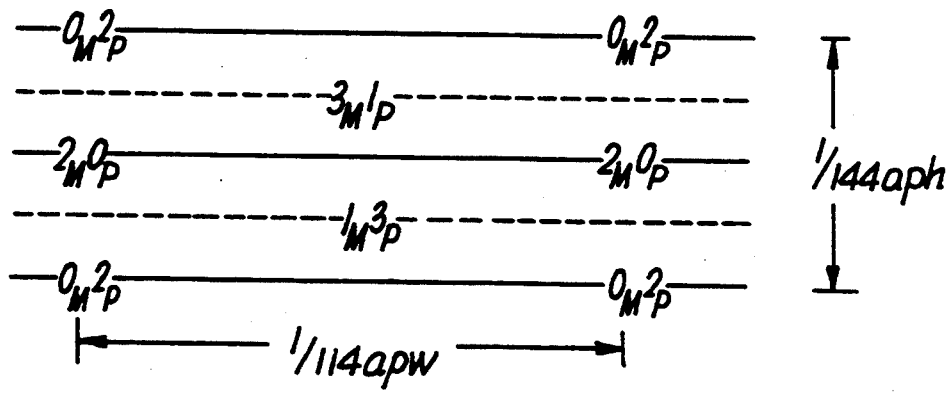
FIG. 18—shows the sampling pattern of the second embodiment with zero horizontal PM shift.

Alternatively, choosing the other value of zero for the horizontal part of the PM offset in the sampling structure, as shown in FIG. 18, results in the horizontal-temporal spectrum of FIG. 19 and the vertical-temporal spectrum of FIG. 20.

Now the folded V has the same vertical frequency range as the baseband V and likewise for the folded U.

The choice of FIG. 13 or 18 for the sampling is governed by the nature of the compatibility with the one-dimensional system that is required. In both cases high pure horizontal frequencies are aliased to low pure horizontal frequencies with a 25 Hz offset, thereby causing flicker. However, the first case gives UV crosstalk whereas the second case gives self aliasing. On the assumption that the high frequency part of a component is likely to be more correlated with its own low frequency part rather than that of the other, the crosstalk might be preferable to the self aliasing.

THIRD VARIATION

Figure 21:
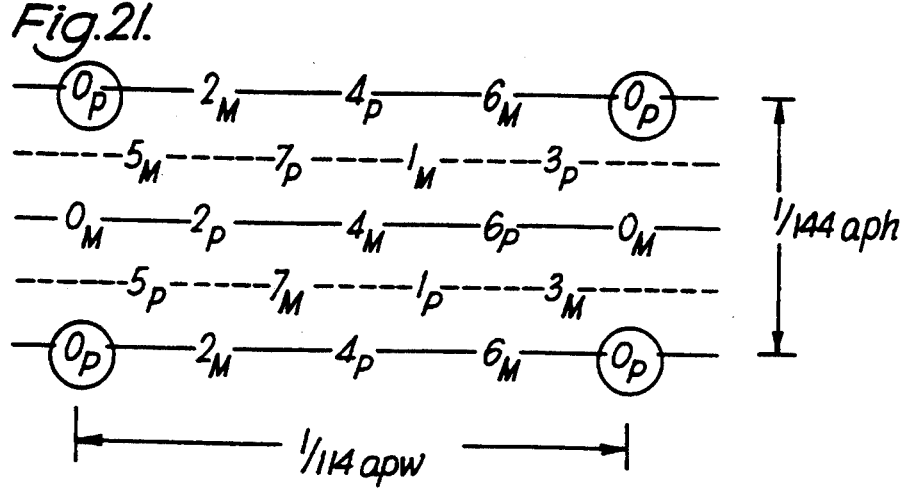
FIG. 21—shows the sampling pattern of a third embodiment zero horizontal PM shift.

The third variation of the technique uses the sampling pattern of FIG. 21 which is a spatial projection of a pattern that repeats over eight fields. The numbers are therefore field numbers, modulo 8 and the subscripts indicate the P or M component. The vertical and horizontal repeat units are 1/144 aph and 1/114 apw and the pattern for a single component is orthogonal within the field. However, the horizontal part of the field-to-field shift is $\frac{3}{8}$ of the horizontal repeat unit, leading to the eight rather than the four-field temporal repeat unit. The horizontal part of the PM shift is chosen to be zero and the smallest horizontal increment corresponds to a sampling frequency of $4f_{SC}$.

Figure 22:
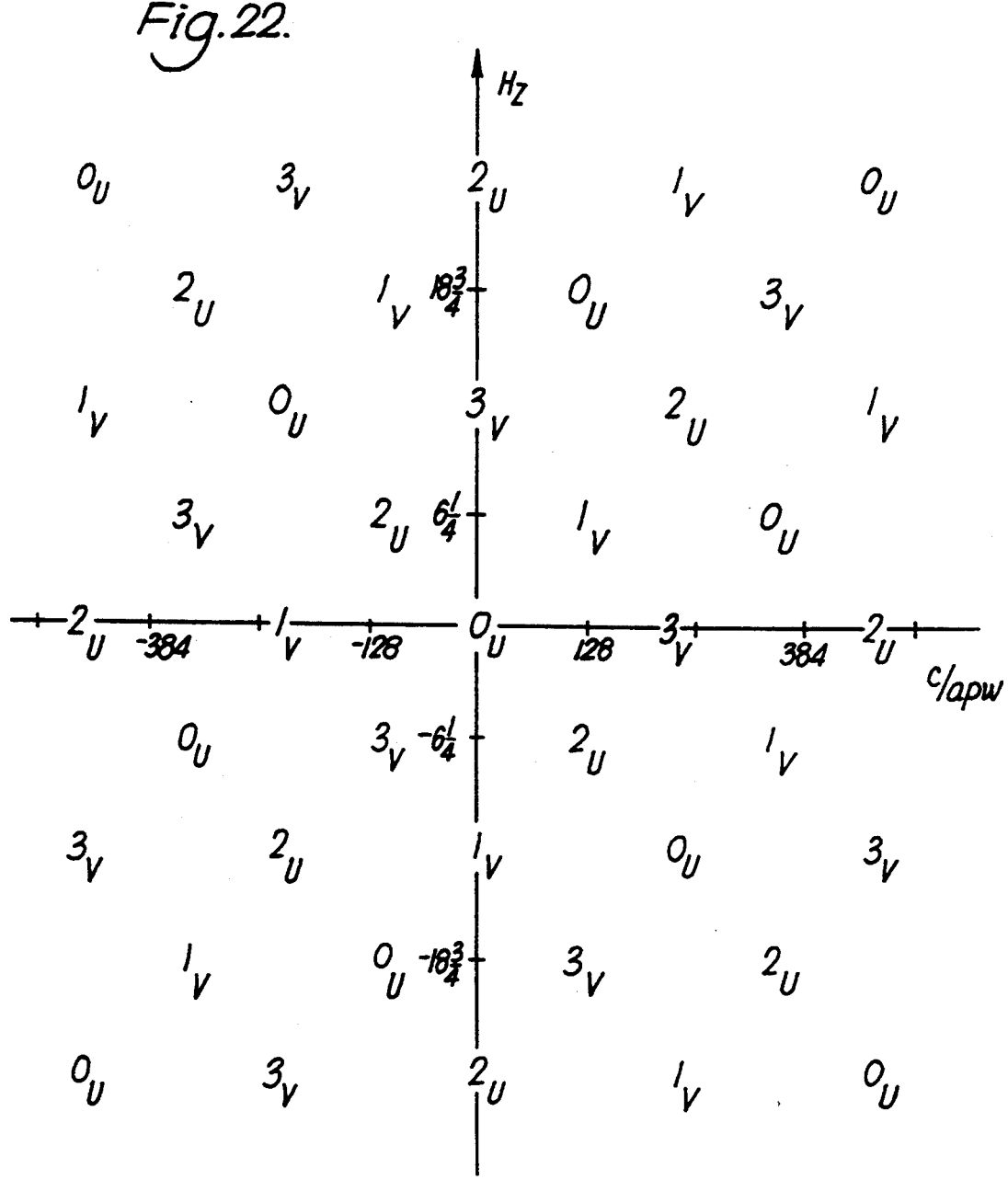
FIG. 22—shows the Fourier transform of the sampling pattern of FIG. 21.
Figure 23:
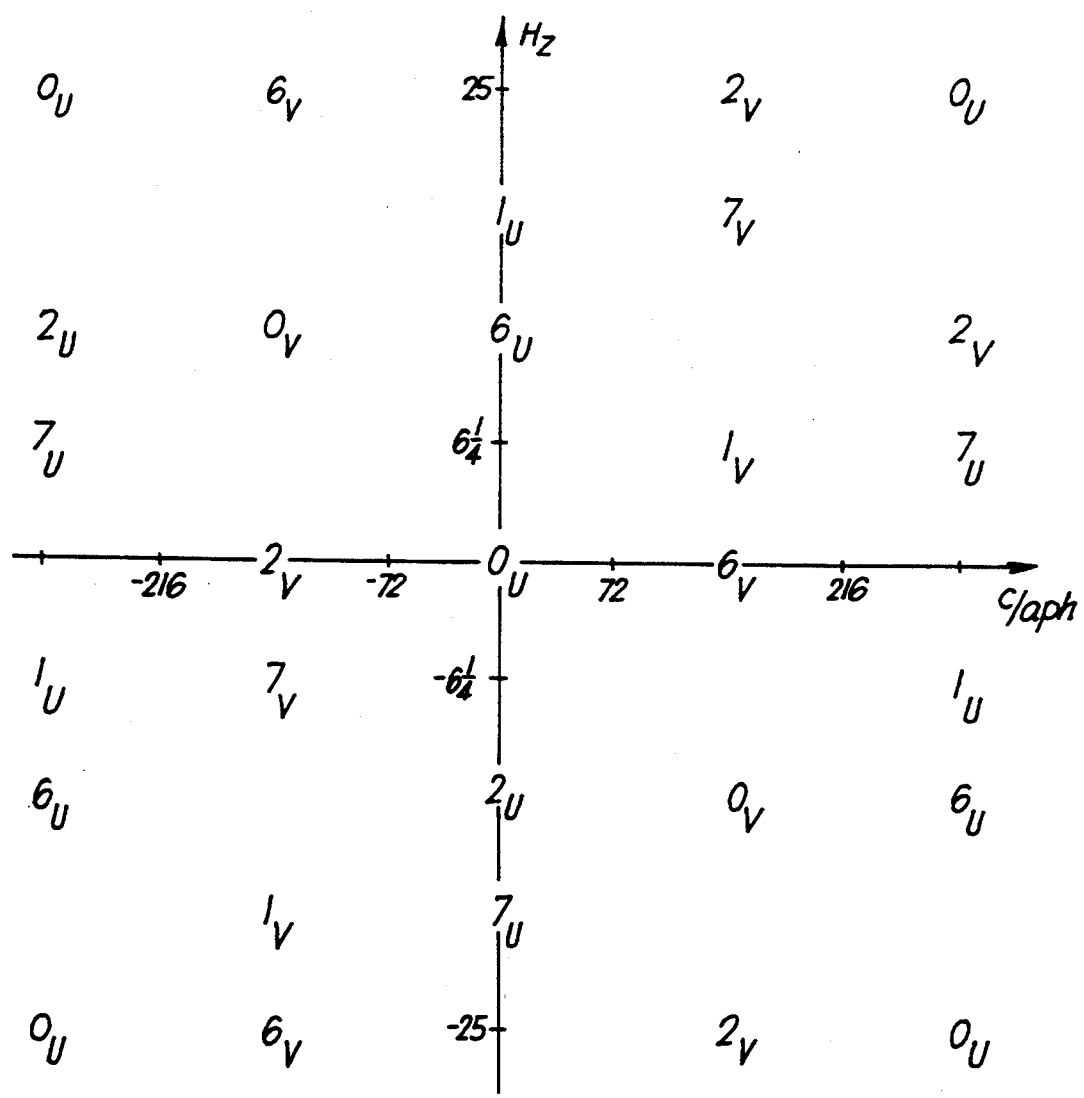
FIG. 23—shows the vertical-temporal frequency projection of the fourier transform of sampling pattern of FIG. 21.

The corresponding Fourier transform of this sampling is shown in FIG. 22 as a horizontal-temporal frequency projection where the numbers are vertical frequency in units of one quarter of the vertical sampling frequency, modulo 4 and the subscripts indicate the U or V component. FIG. 23 shows the vertical-temporal frequency projection over the range −228 to 228 c/apw where the numbers are horizontal frequency in units of the horizontal sampling frequency, modulo 8.

Figure 24:
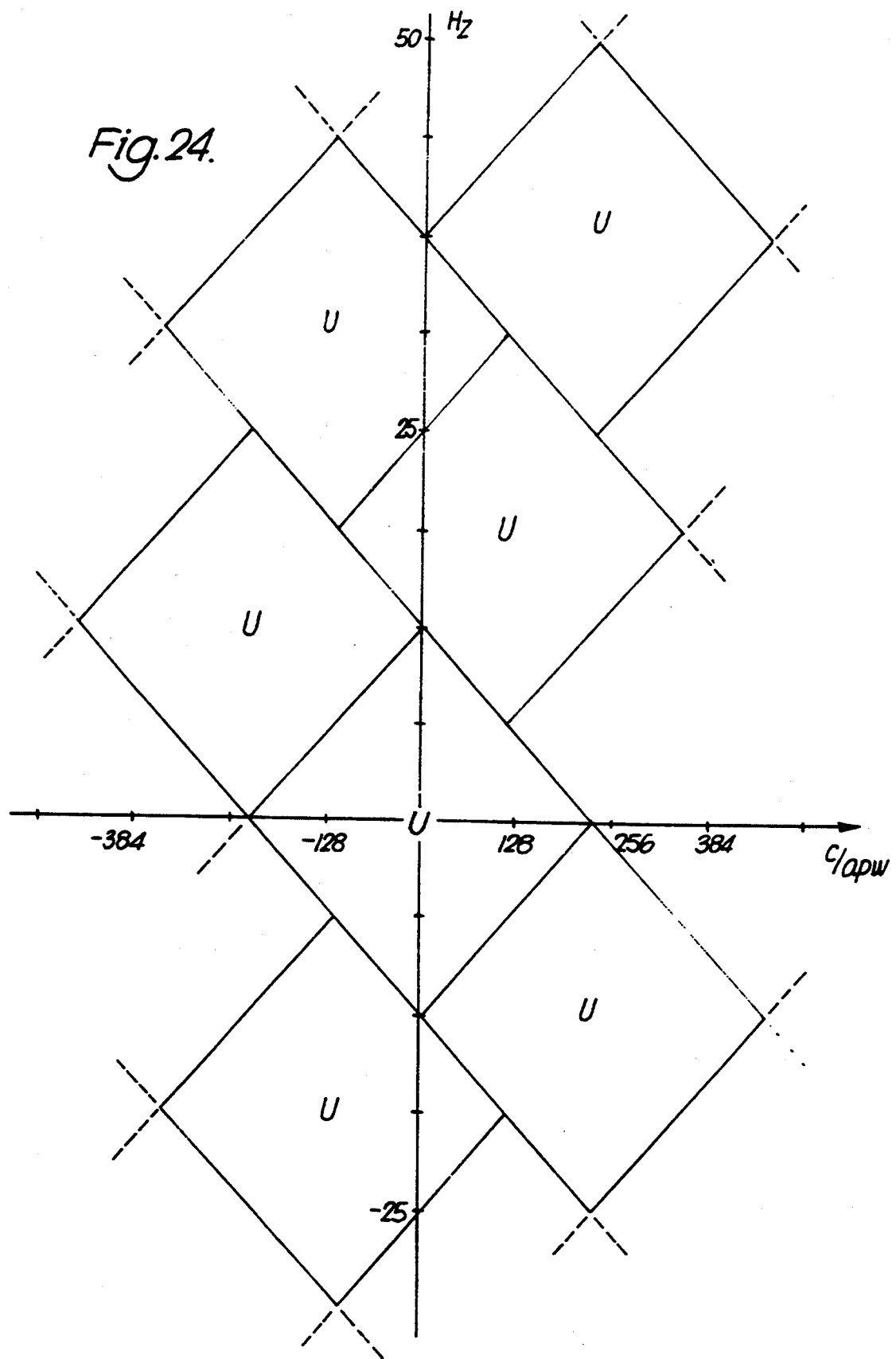
FIG. 24—shows the horizontal-temporal cross-section at zero vertical frequency of spectrum of combined chrominance sampled with pattern of FIG. 21 and filtered with rhombic horizontal-temporal filter.
Figure 25:
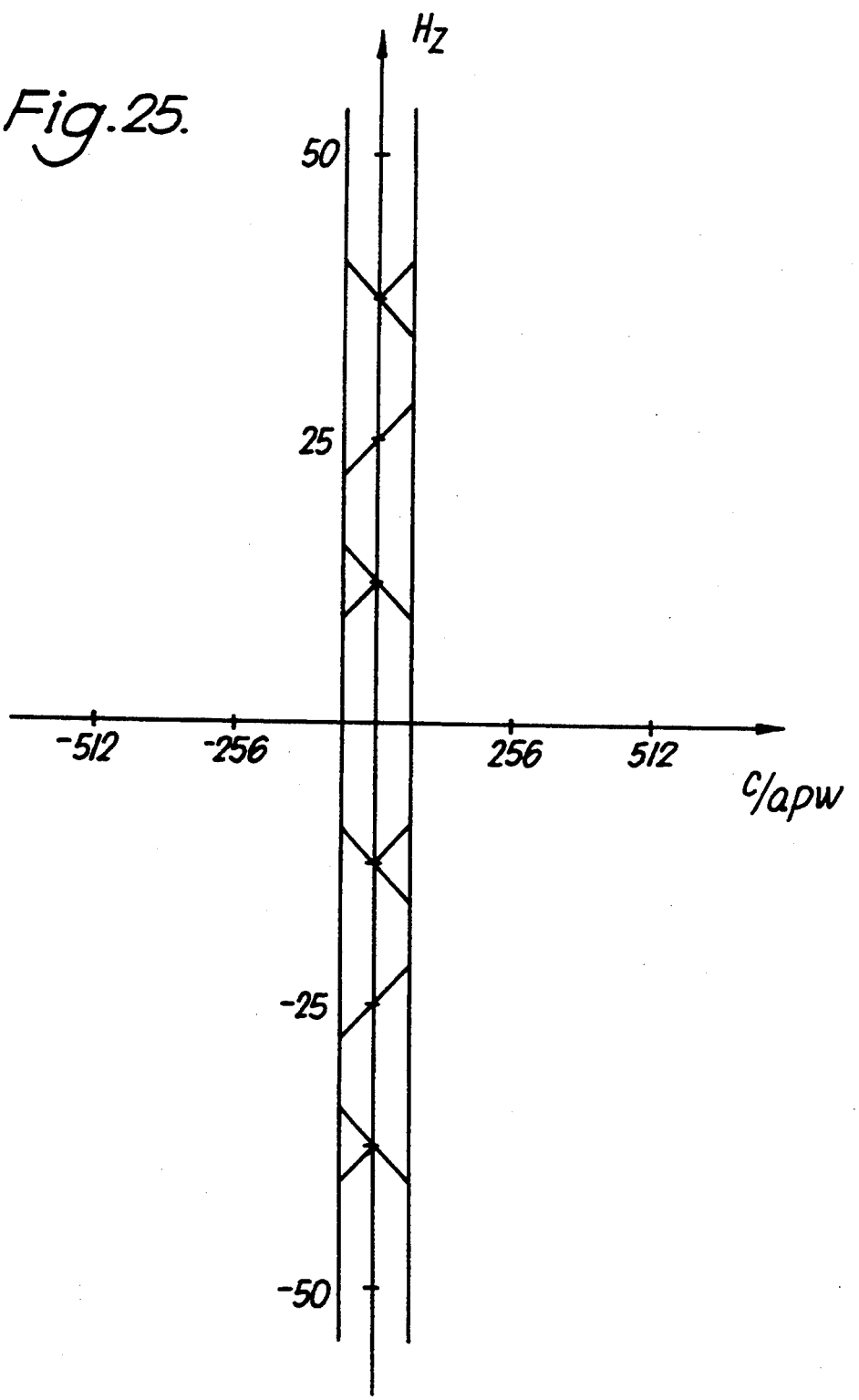
FIG. 25—shows the spectrum of the higher order packed combined chrominance after Nyquist filtering.

FIG. 24 shows the horizontal-temporal projection of the spectrum of the combined chrominance when using a rhombic horizontal-temporal filter for $F_P$ and $F_M$ which trades off more temporal for more horizontal resolution. The maximum horizontal frequency is 228 c/apw in exchange for a maximum temporal frequency of $12\frac{1}{2}$ Hz. This characteristic enables a higher order folding to take place in which spectra are slotted in at one third of the temporal sampling rate. If the signal with this spectrum is subjected to a Nyquist filter cutting at 57 c/apw for transmission, nothing is lost and the original spectral repetition can still be recovered by resampling. FIG. 25 shows the filtered spectrum from which it can be seen that the horizontal frequencies are packed into three bands, one covering the lowest quarter, one covering the central half and one covering the top quarter.

Figure 26:
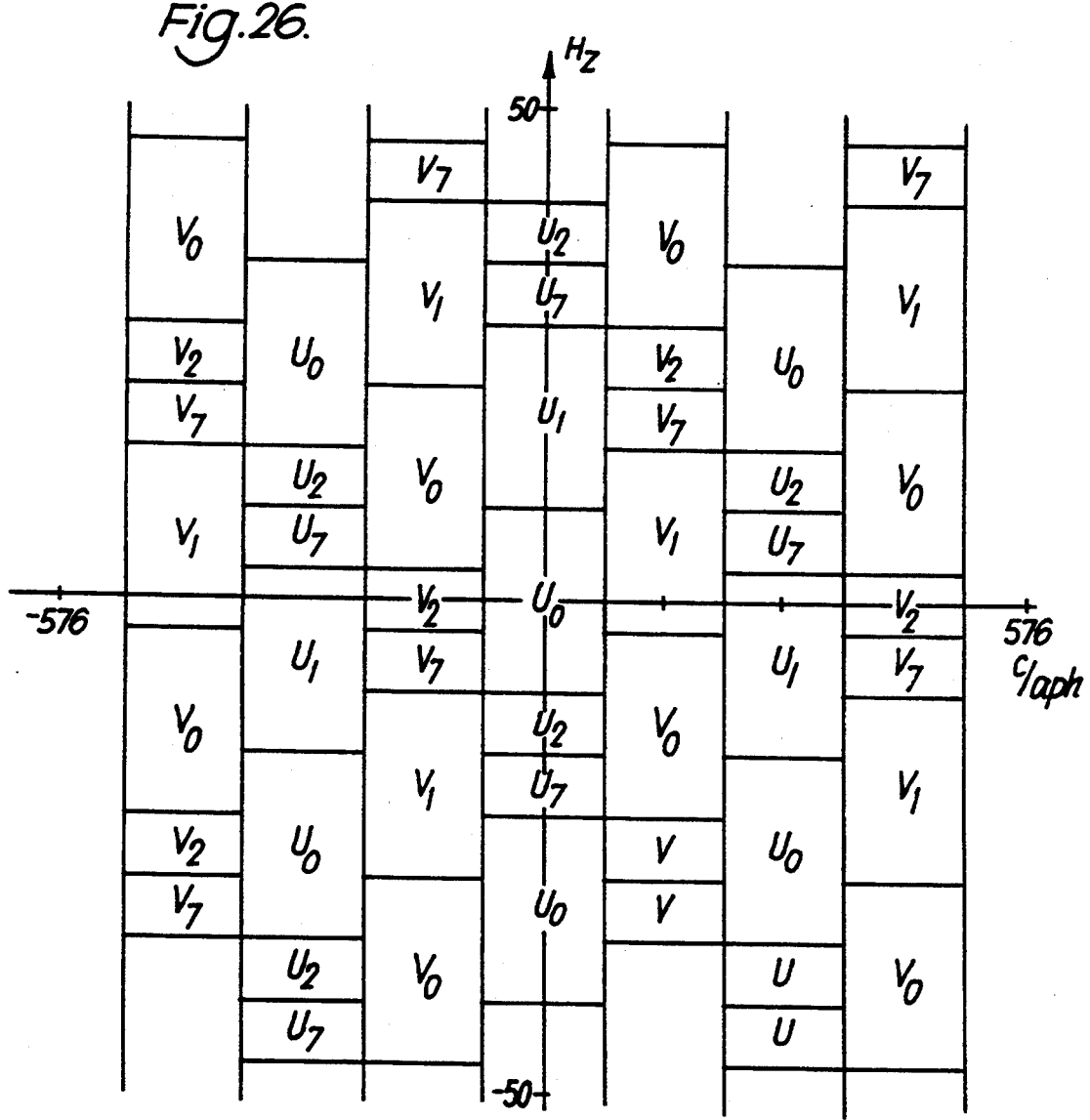
FIG. 26—shows the vertical-temporal cross-section at the horizontal frequency of 57 c/apw of the spectrum of FIG. 24.

The filter characteristic has a vertical frequency bound of 72 c/aph so as to prevent overlap with other spectral layers at multiples of 144 c/aph. This can be seen in FIG. 26 which shows the vertical-temporal cross-section of FIG. 24 at the horizontal frequency of 57 c/apw. The choice of zero horizontal PM shift causes all the folded U spectra to lie in the same vertical frequency range as the baseband U and vice versa for the folded V.

Figure 27:
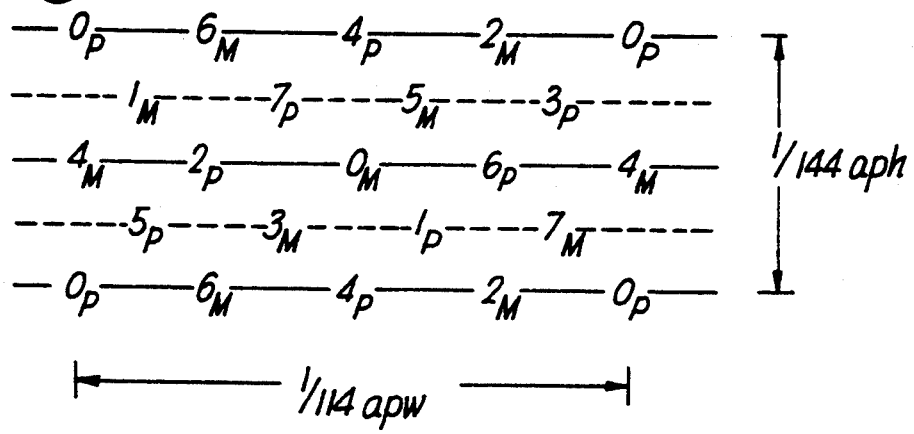
FIG. 27—shows the sampling pattern of the third embodiment with maximum horizontal PM shift.
Figure 29:
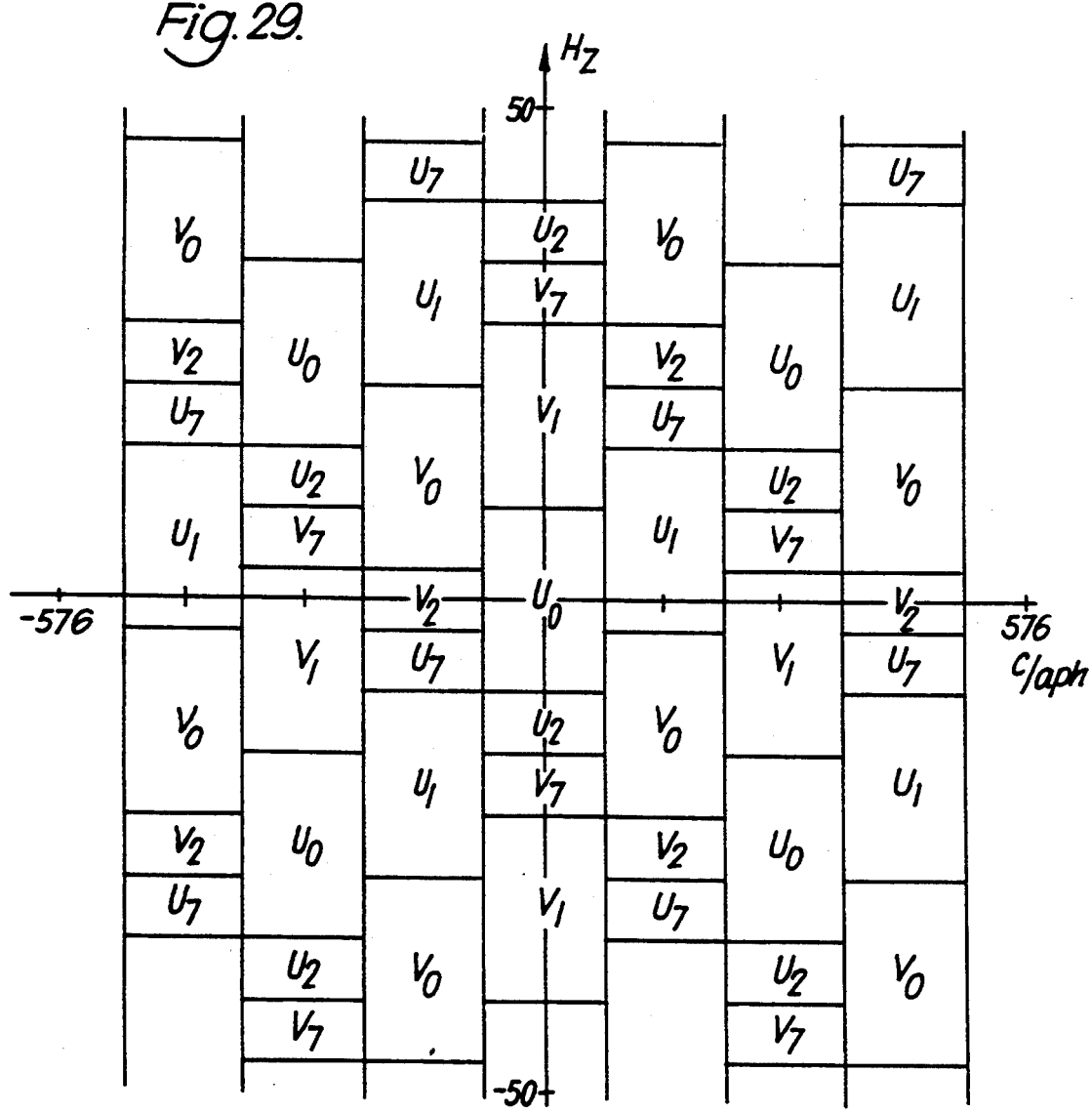
FIG. 29—shows the vertical-temporal cross-section at the horizontal frequency of 57 c/apw of the spectrum of FIG. 28.

Alternatively, choosing a horizontal PM shift of half the horizontal sampling interval in the sampling structure, as shown in FIG. 27, leads to the horizontal-temporal spectrum of FIG. 28 and the vertical-temporal spectrum of FIG. 29. Now only the second-order folded U lies in the same vertical frequency range as the baseband U and the first-order folded U lies in the range of the baseband V, and vice versa.

Again, the choice of the sampling structure of FIG. 21 or FIG. 27 is governed by the required compatibility with the one-dimensional system. This will be similar to that of the previous variation since the majority of the folded spectral energy lies broadly in the same place but at a temporal frequency offset of 18¾ Hz instead of 25 Hz.

FOURTH VARIATION

Figure 31:
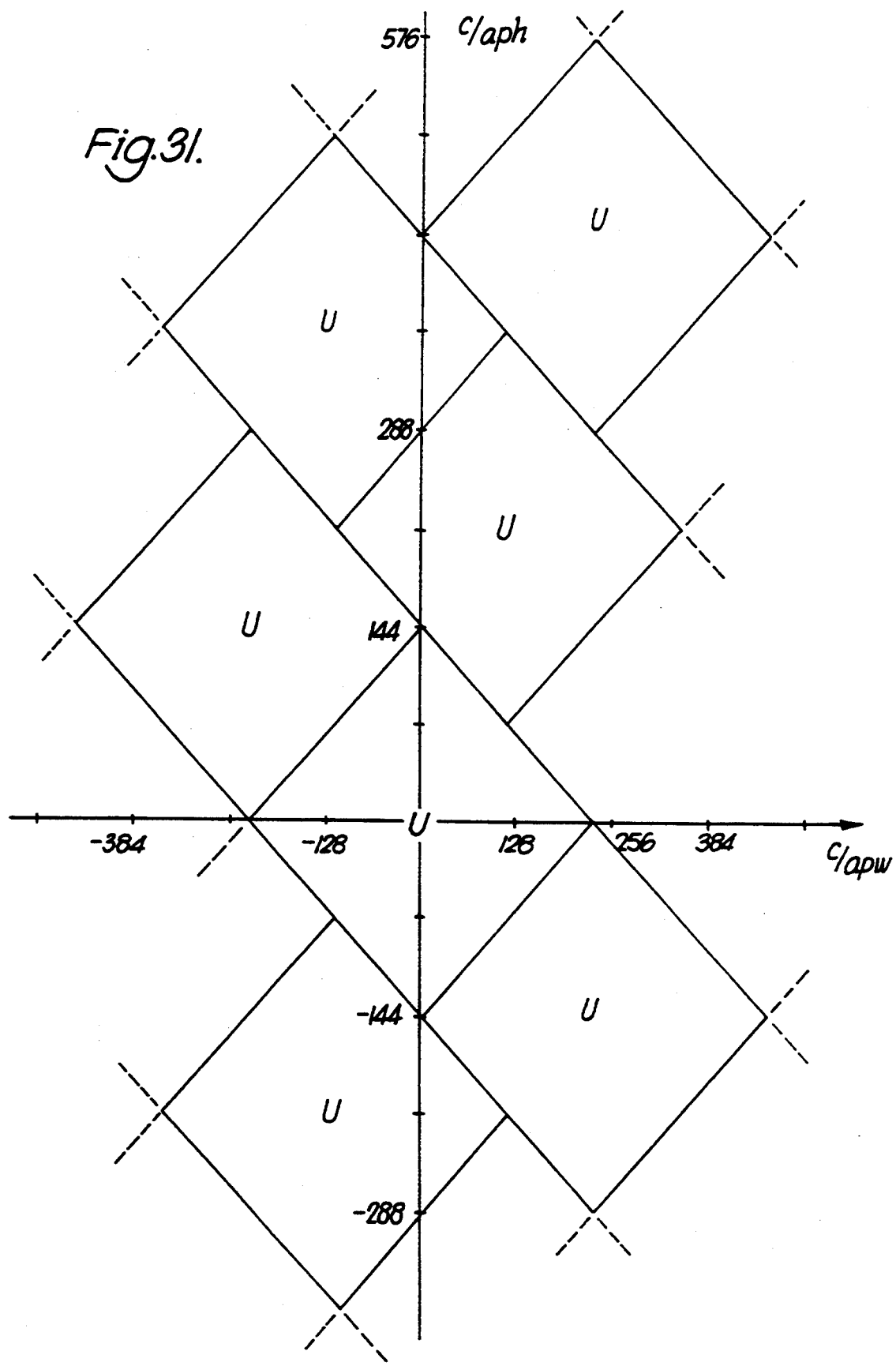
FIG. 31—shows the horizontal-vertical cross-section at zero temporal frequency of spectrum combined chrominance sampled with pattern of FIG. 30 and filtered with rhombic horizontal-vertical filter.
Figure 32:
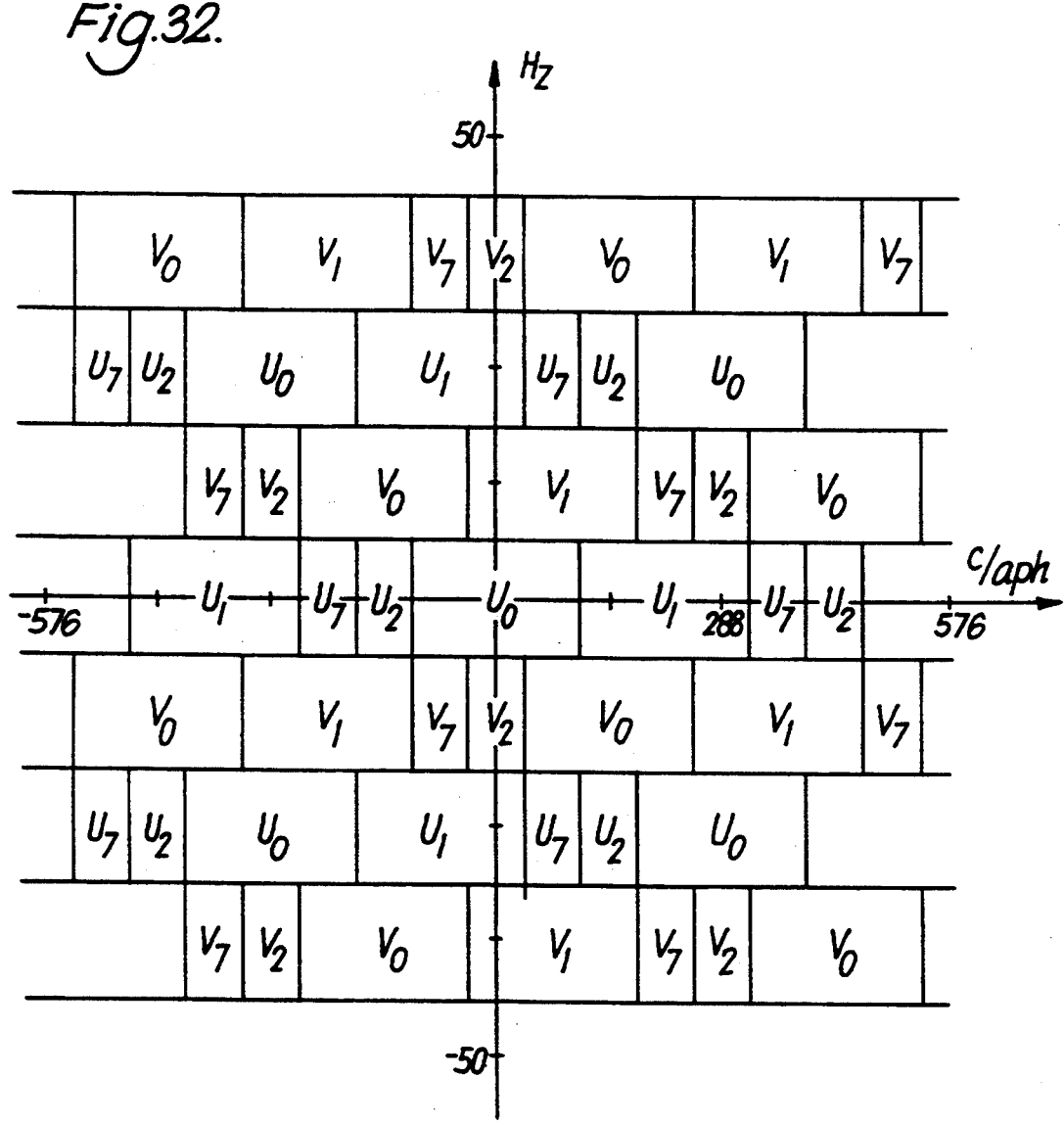
FIG. 32—shows the vertical-temporal cross-section at the horizontal frequency of 57 c/apw of the spectrum of FIG. 31.

The fourth variation is based on the third variation, interchanging vertical and temporal axes. Thus, this variation trades off vertical for horizontal resolution keeping the temporal resolution constant. Based on FIG. 21, the sampling pattern is that of FIG. 30 which leads to the horizontal-vertical spectrum of FIG. 31 and the vertical-temporal spectrum of FIG. 32. Thus the maximum horizontal and vertical resolutions are 228 c/apw and 144 c/aph whilst the temporal resolution is 6¼ Hz.

Figure 33:
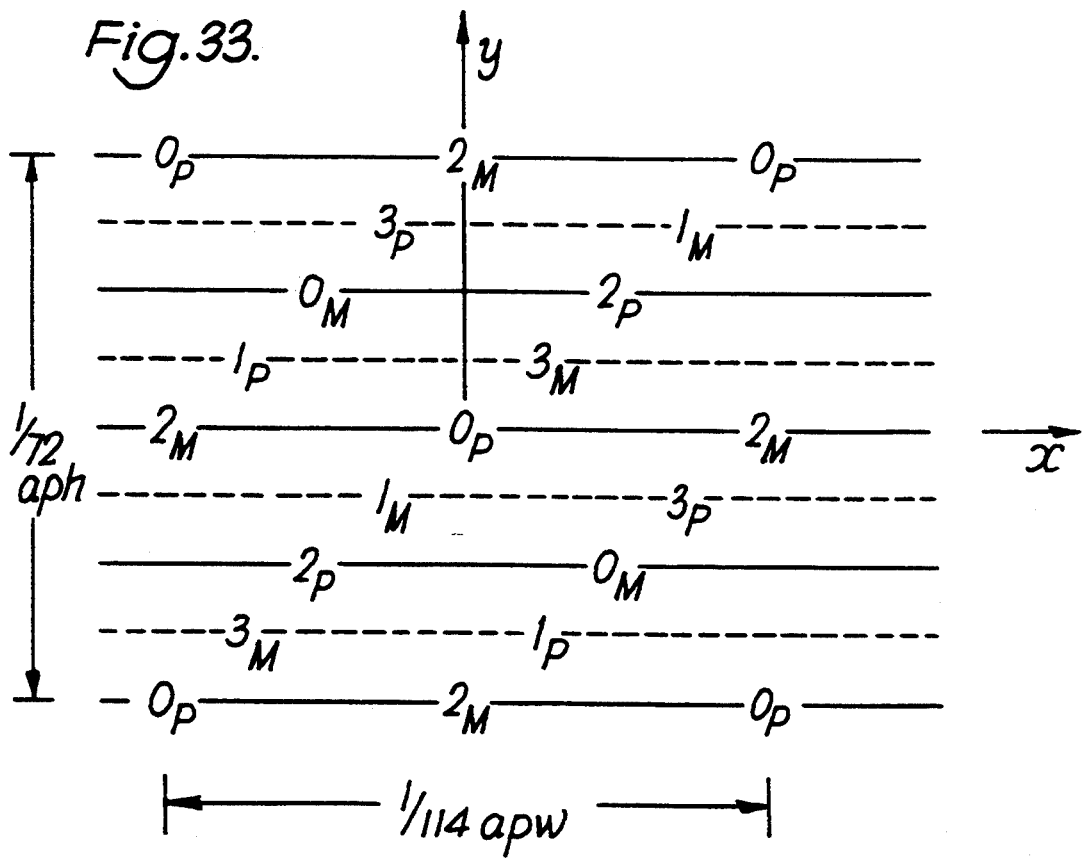
FIG. 33—shows the sampling pattern of the fourth embodiment based on the third embodiment as sampled in FIG. 27.
Figure 34:
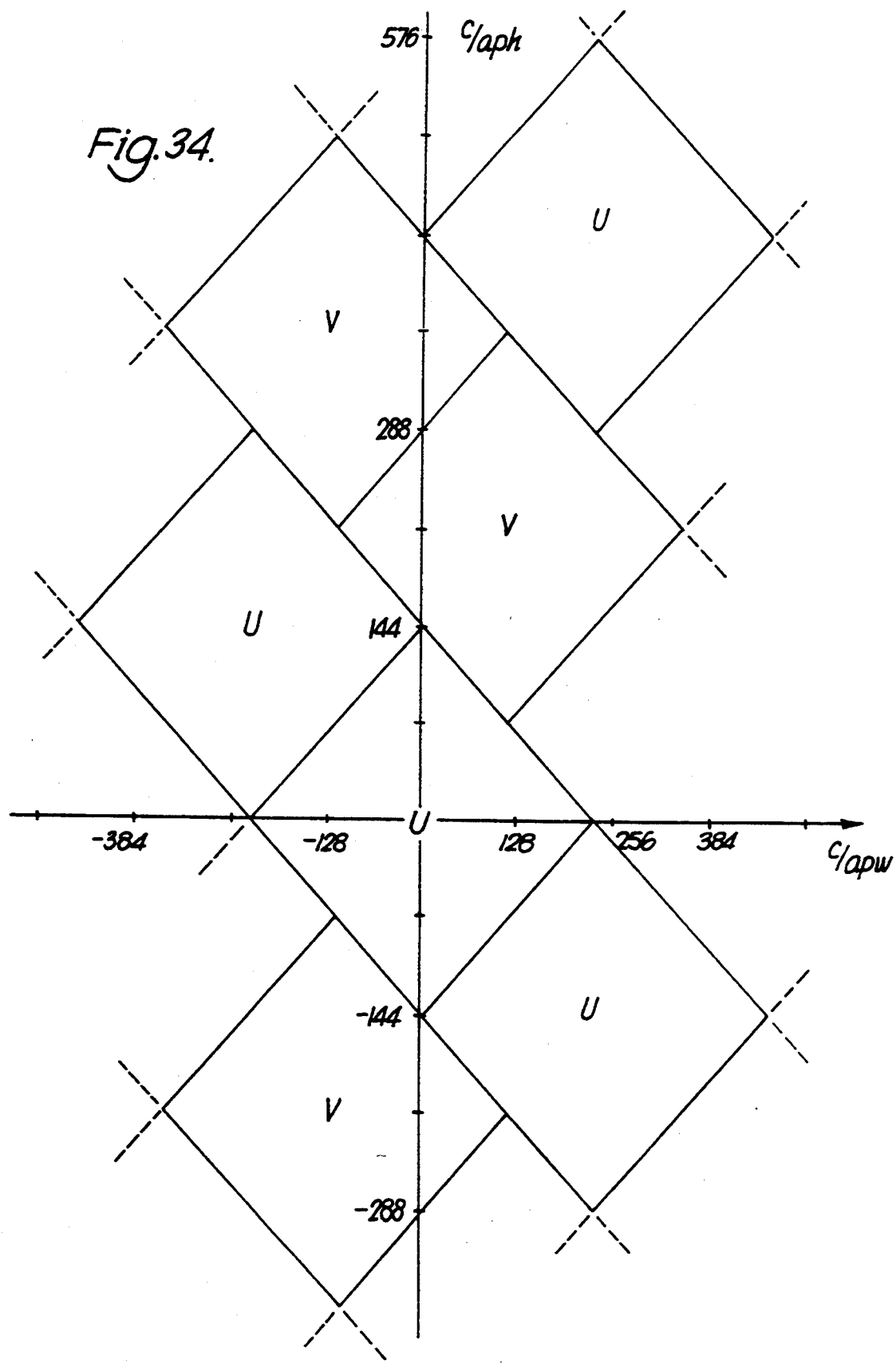
FIG. 34—shows the horizontal-vertical cross-section at zero temporal frequency of spectrum of combined chrominance sampled with pattern of FIG. 33 and filtered with rhombic horizontal-vertical filter.
Figure 35:
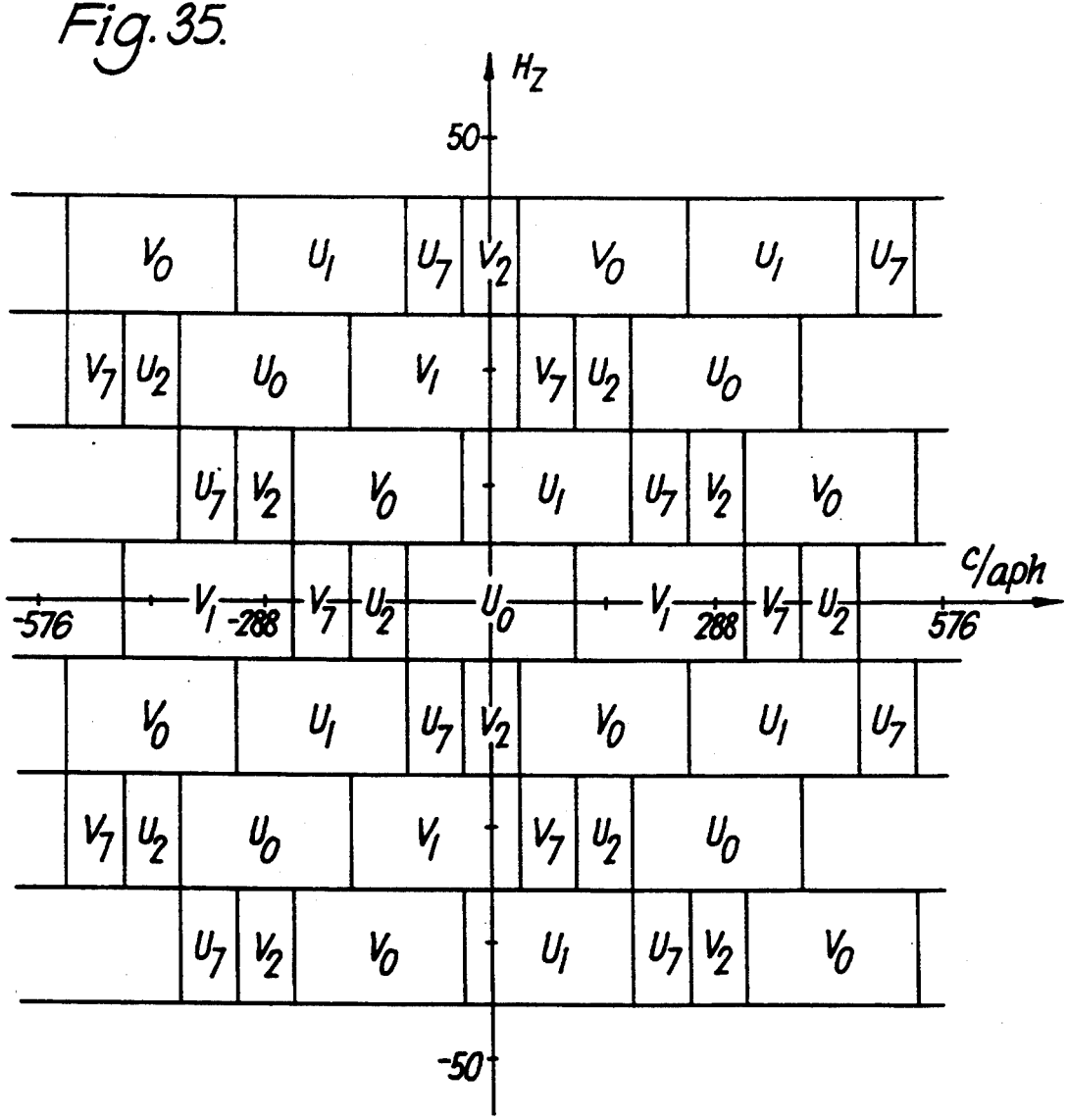
FIG. 35—shows the vertical-temporal cross-section at the horizontal frequency of 57 c/apw of the spectrum of FIG. 34.

Alternatively, based on FIG. 27, the sampling pattern is that of FIG. 33 which leads to the horizontal-vertical spectrum of FIG. 34 and the vertical-temporal spectrum of FIG. 35.

Figure 30:
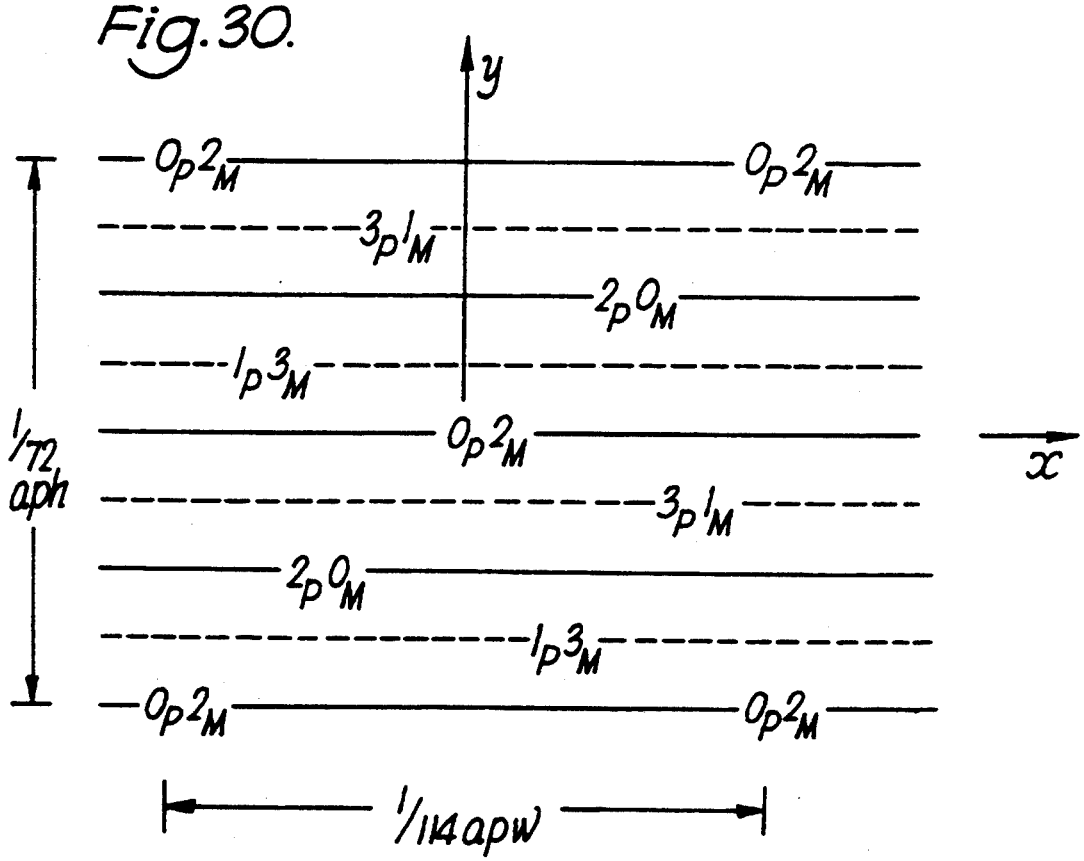
FIG. 30—shows the sampling pattern of a fourth embodiment based the third embodiment as sampled in FIG. 21.

The difference in compatibility between the structures of FIG. 30 and FIG. 33 is far less clear.

The system has been described in terms of system I PAL in which the available bandwidth for the chrominance signal is 1.1. MHz. The system is also applicable, for example, to system BG PAL, the bandwidth of which is only 5 MHz with a colour subcarrier at the PAL standard 4.43 MHz. Thus the bandwidth of the Nyquist filters will be reduced to approximately 0.57 MHz which represents a horizontal resolution of approximately 31 c/apw consequently the horizontal pitch of all the sampling structures will be scaled 2:1 sampling with an $F_{SC}/4$ clock.

What is claimed is:

1. Video signal encoding apparatus for a Weston PAL video signal, said Weston PAL video signal comprising:
   a chrominance signal having a horizontal bandwidth; and
   a color subcarrier;
   wherein said video signal encoding apparatus is for increasing said horizontal bandwidth of said chrominance signal of said Weston PAL video signal for transmission in a transmission channel having a channel bandwidth, and comprises:
   means (102, 104) for providing a luminance signal (Y);
   means (120) for deriving from input U and V chrominance signals a sum chrominance signal (U+V) and a difference chrominance signal (U−V);
   means (122, 124) for pre-filtering said sum and difference chrominance signals;
   sampling means (126,128) for horizontally sampling said filtered sum and difference chrominance signals along video lines at a frequency an integral submultiple of said colour subcarrier equal to substantially twice the difference between said channel bandwidth and said colour subcarrier;
   switching means (136) for selecting in turn one of said sampled and filtered sum and difference chrominance signals on alternate lines and said other of said sampled and filtered sum and difference chrominance signals on intervening lines;
   a horizontal filter (142) for filtering the selected one of said sampled and filtered sum and difference chrominance signals;
   means (140) for modulating the selected one of said horizontally filtered, sampled and filtered sum and difference chrominance signals onto said colour subcarrier to produce a modulated subcarrier; and
   means (114) for combining said modulated subcarrier with said luminance signal (Y) for transmission or recording;
   wherein said means for horizontally sampling said filtered sum and difference chrominance signals comprises means for forming samples of said sum chrominance signal on the alternate video lines to said samples of said difference chrominance signal for sampling according to sampling patterns for said sum and difference chrominance signals which are substantially identical but spatially shifted relative to each other.

2. Apparatus according to claim 1 wherein the horizontal filter comprises a square root Nyquist filter for filtering the selected samples prior to modulation to define the horizontal bandwith of the chrominance signals.

3. Apparatus according to claim 1 or 2 wherein the means for prefiltering the sum and difference chrominance signals comprises a rhombic filter applying diagonal constraint in two of the vertical, temporal and horizontal frequency dimensions.

4. Apparatus according to claim 1 wherein the sampling means (126,128) for sampling the sum and difference chrominance signals forms samples of each chrominance signals in a quincunxial pattern within a field.

5. Apparatus according to claim 4 wherein the sampling pattern of the sampling means (126,128) repeats over eight fields.

6. Apparatus according to claims 4 or 5 in which the vertical repeat unit of the sampling pattern is eight active lines.

7. Apparatus according to claim 3, wherein the means (122,124) for prefiltering the sum and difference chrominance signals before sampling comprises a rhombic spatial filter with no temporal variation.

8. Apparatus according to claim 7, wherein the diagonal bound of the rhombic spatial filter is perpendicular to and bisects the vector joining the origin to the spatial projection of the sampling frequency.

9. Apparatus according to claim 3, wherein the means (122,124) for prefiltering the sum and difference chrominance signals before sampling comprises a rhombic vertical-temporal filter having no horizontal variation.

10. Apparatus according to claim 1, wherein the sampling means (126,128) for sampling the first and second chrominance signals forms samples of each chrominance signal in an orthogonal pattern within a field.

11. Apparatus according to claim 10, wherein the vertical repeat unit of the sampling pattern is four picture lines.

12. Apparatus according to claim 11, wherein the vertical shift of samples of the second chrominance signal with respect to samples of the first chrominance signal is half the vertical repeat unit.

13. Apparatus according to claim 11, wherein the horizontal shift of samples of the second chrominance signal with respect to samples of the first chrominance signal is half the horizontal repeat unit.

14. Apparatus according to claim 11, wherein the horizontal shift of samples of the second chrominance signal with respect to samples of the first chrominance signal is zero.

15. Apparatus according to claim 10, wherein the sampling pattern repeats every four fields.

16. Apparatus according to claim 9, wherein the sampling pattern repeats every eight fields.

17. Apparatus according to claim 16 wherein the horizontal shift of samples of each chrominance signal from field to field is three eights of the horizontal repeat unit.

18. Apparatus according to claim 4 wherein the sampling pattern repeats every 4 fields.

19. Apparatus according to claim 18, wherein the vertical repeat unit of the sampling pattern is eight picture lines.

20. Apparatus according to claim 10, wherein the means (122,124) for filtering the first and second chrominance signals before sampling comprises a rhombic horizontal-temporal filter having no vertical variation.

21. Apparatus according to claim 2, wherein the sampling means forms a sampling pattern having a horizontal repeat unit, wherein the horizontal repeat unit of the sampling pattern is substantially equal to the maximum sustainable through the Nyquist filter.

22. Apparatus according to claim 21, wherein the channel bandwidth is 5.5 MHz, the maximum horizontal bandwidth is 1.1 MHz and the horizontal repeat unit is 1/114 active picture width.

23. Apparatus according to claim 21, wherein the channel bandwidth is 5 MHz, the maximum horizontal bandwidth 0.57 MHz and the horizontal repeat unit is 1/57 active picture width.

24. Video signal decoding apparatus for decoding a Weston PAL video signal comprising:
means (314) for separating a received PAL video signal into luminance (Y) and chrominance (UV) signals;
means (340) for demodulating the received chrominance signal to form a sum chrominance signal (U+V) on alternate lines and a difference chrominance signal (U−V) on intervening video lines;
filter means (342) for filtering the sum and difference chrominance signals produced by the means for demodulating;
sampling means (326,328) for sampling horizontally along video lines the filtered sum and difference chrominance signals placed on alternate lines, the sampling frequency being an integral submultiple of the colour subcarrier equal to substantially twice the difference between the transmission channel bandwidth and the colour subcarrier;
post-filter means (322,324) for filtering the sampled and filtered sum and difference chrominance signals; and
means (320) for forming from the post-filtered and filtered sampled chrominance signals separate output U and V chrominance signals;
wherein the sampling means for sampling the filtered sum and difference chrominance signals comprises means for forming samples of the filtered sum and difference chrominance signals on alternate video lines and the sampling patterns of the sampling means for the filtered sum and difference chrominance signals are substantially identical but spatially shifted relative to each other.

25. Apparatus according to claim 24 wherein the post-filter means for post-filtering is a rhombic filter having a diagonal bound in two of the vertical, horizontal and temporal frequency dimensions.

26. A Weston PAL video signal modified by processing the chrominance (U,V) components to form sum (U+V) and difference (U−V) components, filtering the sum and difference components with a rhombic spatial or spatio-temporal filter and sampling the filtered (U+V) and (U−V) components with a sampling pattern which places samples of one of the U+V and U−V components on alternate video lines and samples of the other of said U+V and U−V components on intervening lines, and applies a substantially identical, but spatially shifted sampling pattern to the (U+V) and U−V chrominance components respectively.

27. A Weston PAL video signal transmission system for a Weston PAL video signal having a colour subcarrier, the system comprising:
at a transmitter:
a video signal source having luminance (Y) and colour difference (U,V) components;
means for providing a luminance component;
means for deriving from the colour difference components, sum and difference chrominance components ((U+V), (U−V));
prefilter means for filtering the sum and difference chrominance components and comprising a rhombic filter having a diagonal bound in at least two of the vertical, horizontal and temporal frequency dimensions;
sampling means for horizontally sampling along video lines the filtered sum and difference chrominance components and comprising means for forming samples of the sum components on alternate video lines to the samples of the difference components, and means for sampling the sum and difference components according to substantially identical, relatively spatially shifted sampling patterns, the sampling frequency being an integral submultiple of the colour subcarrier equal to substantially twice the difference between the transmission channel bandwidth and the subcarrier;

switching means for selecting one of the filtered and sampled sum and difference chrominance components on alternate lines and the other of said sampled components on intervening lines;

means for modulating the selected filtered and sampled sum and difference chrominance components onto the colour sub-carrier; and means for combining the modulated sub-carrier with the luminance component for transmission as an analogue signal;

and at a receiver:

means for receiving the transmitted signal and for separating therefrom luminance (Y) and chrominance (U,V) components;

means for demodulating the chrominance components (U,V) to form therefrom sum and difference chrominance components (U+V), (U−V), one of the sum and difference components being on alternate video lines, and the other being on intervening lines;

sampling means for sampling horizontally along video lines the sum and difference chrominance components, the sampling means sampling the sum components on alternate video lines to the difference components and applying substantially identical relatively spatially shifted sampling patterns to the components, the sampling frequency being an integral submultiple of the colour subcarrier equal to substantially twice the difference between the transmission channel bandwidth and the subcarrier;

filter means for post filtering the sampled sum and difference chrominance components; and means for forming from the filtered sampled components separate output U and V chrominance signals;

the system further comprising at at least one of the transmitter and the receiver:

a Nyquist filter arranged between the chrominance sampling means in the transmitter and the receiver, the Nyquist filter acting on the sum and difference chrominance components to impose an upper limit on the horizontal bandwidth of the components.

* * * * *